US012607704B2

(12) United States Patent
Kim et al.

(10) Patent No.: US 12,607,704 B2
(45) Date of Patent: Apr. 21, 2026

(54) METHOD OF GENERATING TRAINING DATA FOR TRAINING INDOOR SPACE RECOGNITION MODEL, AND COMPUTING APPARATUS FOR PERFORMING THE SAME

(71) Applicant: SAMSUNG ELECTRONICS CO., LTD., Suwon-si (KR)

(72) Inventors: Suhyun Kim, Suwon-si (KR); Sangmin Kim, Suwon-si (KR); Sunghyun Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/235,209

(22) Filed: Aug. 17, 2023

(65) Prior Publication Data

US 2024/0061067 A1      Feb. 22, 2024

Related U.S. Application Data

(63) Continuation of application No. PCT/KR2023/012128, filed on Aug. 16, 2023.

(30) Foreign Application Priority Data

Aug. 17, 2022      (KR) ........................ 10-2022-0102949

(51) Int. Cl.
*G01S 5/02* (2010.01)
*H04B 17/318* (2015.01)

(52) U.S. Cl.
CPC ........ *G01S 5/02525* (2020.05); *H04B 17/318* (2015.01)

(58) Field of Classification Search
None
See application file for complete search history.

(56) References Cited

U.S. PATENT DOCUMENTS 8,320,939 B1      11/2012  Vincent
10,070,264 B2      9/2018  Han et al.
(Continued)

FOREIGN PATENT DOCUMENTS

KR      10-2009-0063549 A      6/2009
KR      10-2018-0029817 A      3/2018
(Continued)

OTHER PUBLICATIONS

International Search Report and Written Opinion (PCT/ISA/220, PCT/ISA/210, and PCT/ISA/237) dated Nov. 20, 2023, issued by International Searching Authority for International Application No. PCT/KR2023/012128.

(Continued)

*Primary Examiner* — Adolf Dsouza
(74) *Attorney, Agent, or Firm* — Sughrue Mion, PLLC

(57) ABSTRACT

A method is directed to generating training data for training an indoor space recognition model. The method includes collecting, by using a mobile terminal in a plurality of spaces in an indoor space, data obtained by measuring received signal strength indicator (RSSI) values of signals transmitted from a plurality of signal sources; obtaining reference data in which the RSSI values measured for the signals transmitted from the plurality of signal sources are matched and stored with the plurality of spaces; selecting one or more signal sources of the plurality of signal sources as a feature set based on the collected data and the reference data; performing clustering on the collected data and the reference data based on the feature set; and generating the training data by matching and storing the collected data with at least one of the plurality of spaces based on a result of the clustering.

18 Claims, 20 Drawing Sheets

(56) References Cited

U.S. PATENT DOCUMENTS

| | | | |
|---|---|---|---|
| 10,430,492 | B1 | 10/2019 | Kerr et al. |
| 2012/0306683 | A1* | 12/2012 | Viikari .................. G01S 13/756 342/51 |
| 2014/0018111 | A1* | 1/2014 | Farley ................... H04W 4/023 455/456.6 |
| 2015/0116144 | A1* | 4/2015 | Serrano Olmedo .. G01S 5/0295 342/351 |
| 2016/0139238 | A1* | 5/2016 | Bekkali .................. G01S 13/75 342/463 |
| 2018/0041985 | A1 | 2/2018 | Davaadorj et al. |
| 2020/0271769 | A1 | 8/2020 | Eschey et al. |
| 2022/0141619 | A1* | 5/2022 | Parikh .................. H04W 4/029 455/456.1 |
| 2023/0394257 | A1* | 12/2023 | Andre ................. G06Q 10/087 |

FOREIGN PATENT DOCUMENTS

| | | | |
|---|---|---|---|
| KR | 10-2018-0040841 | A | 4/2018 |
| KR | 10-1945320 | B1 | 2/2019 |
| KR | 10-2019-0064345 | A | 6/2019 |
| KR | 10-2019-0068479 | A | 6/2019 |
| KR | 10-2064680 | B1 | 1/2020 |
| KR | 10-2021-0090058 | A | 7/2021 |
| KR | 20210090058 | A * | 7/2021 .............. G01S 11/06 |
| KR | 10-2022-0077233 | A | 6/2022 |

OTHER PUBLICATIONS

Communication dated Jul. 3, 2025 issued by the European Patent Office in European Patent Application No. 23855151.9.

Riaz Uddin Mondal et al., "Cluster-Based RF Fingerprint Positioning Using LTE and WLAN Signal Strengths", International Journal of Wireless Information Networks, Plenum Press, vol. 24, No. 4, Aug. 16, 2017, XP036353831, ISSN: 1068-9605, DOI:10.1007/S10776-017-0369-9, pp. 413-423 (11 pages total).

Yifei Jiang et al., "ARIEL: Automatic Wi-Fi based Room Fingerprinting for Indoor Localization", Low Power Electronics and Design, ACM, Sep. 5, 2012, XP059222217, DOI:10.1145/2370216.2370282, ISBN: 978-1-4503-4185-1, pp. 441-450 (10 pages total).

* cited by examiner

FIG. 3

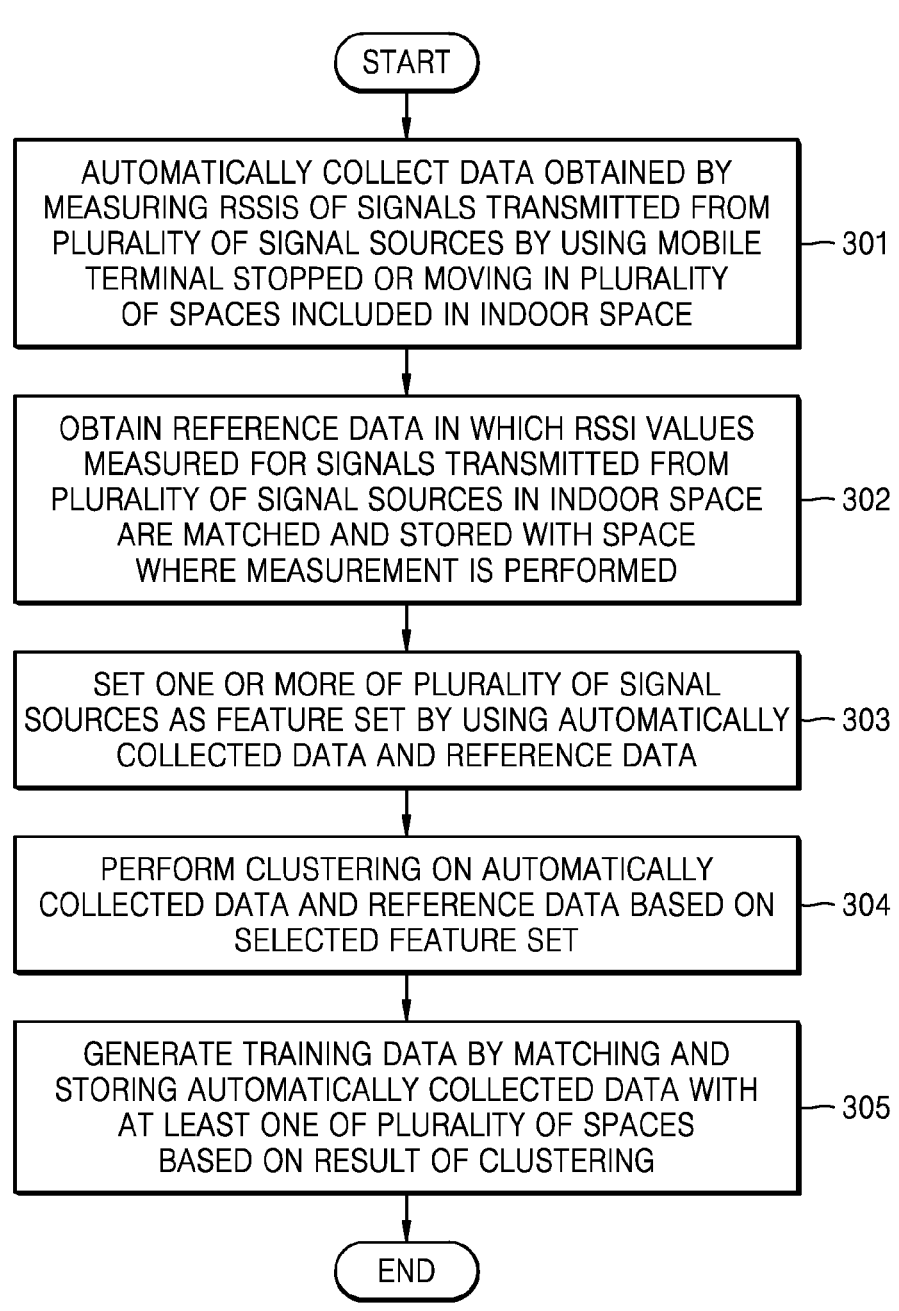

START

AUTOMATICALLY COLLECT DATA OBTAINED BY MEASURING RSSIS OF SIGNALS TRANSMITTED FROM PLURALITY OF SIGNAL SOURCES BY USING MOBILE TERMINAL STOPPED OR MOVING IN PLURALITY OF SPACES INCLUDED IN INDOOR SPACE ⏤ 301

OBTAIN REFERENCE DATA IN WHICH RSSI VALUES MEASURED FOR SIGNALS TRANSMITTED FROM PLURALITY OF SIGNAL SOURCES IN INDOOR SPACE ARE MATCHED AND STORED WITH SPACE WHERE MEASUREMENT IS PERFORMED ⏤ 302

SET ONE OR MORE OF PLURALITY OF SIGNAL SOURCES AS FEATURE SET BY USING AUTOMATICALLY COLLECTED DATA AND REFERENCE DATA ⏤ 303

PERFORM CLUSTERING ON AUTOMATICALLY COLLECTED DATA AND REFERENCE DATA BASED ON SELECTED FEATURE SET ⏤ 304

GENERATE TRAINING DATA BY MATCHING AND STORING AUTOMATICALLY COLLECTED DATA WITH AT LEAST ONE OF PLURALITY OF SPACES BASED ON RESULT OF CLUSTERING ⏤ 305

END

|  | Wi-Fi1 | Wi-Fi2 | Wi-Fi3 | SPACE |
|---|---|---|---|---|
| Data 1 | −101 | −74 | −42 | LIVING ROOM |
| Data 2 | −33 | −61 | −78 | ROOM2 |
| Data 3 | −107 | −84 | −54 | ROOM1 |
| Data 4 | −39 | −57 | −81 | ROOM2 |
| Data 5 | −42 | −24 | −94 | ROOM3 |

| | Wi-Fi1 | Wi-Fi2 | Wi-Fi3 | DETECTION OF MOVEMENT | CHUNK |
|---|---|---|---|---|---|
| Data A1 | −84 | −58 | −74 | STOPPED | chunk 1 |
| Data A2 | −80 | −61 | −77 | STOPPED | chunk 1 |
| Data A3 | −37 | −60 | −102 | MOVING | |
| Data A4 | −79 | −63 | −80 | MOVING | |
| Data A5 | −75 | −66 | −81 | STOPPED | chunk 2 |
| Data A6 | −76 | −68 | −79 | STOPPED | chunk 2 |
| Data A7 | −51 | −88 | −45 | MOVING | |
| Data A8 | −39 | −92 | −26 | STOPPED | chunk 3 |

|  | Wi-Fi1 | Wi-Fi2 | Wi-Fi3 | SPACE |
|---|---|---|---|---|
| Data M1 | −94 | −41 | −80 | LIVING ROOM |
| Data M2 | −70 | −27 | −65 | ROOM1 |
| Data M3 | −45 | −30 | −88 | ROOM2 |
| Data M4 | −47 | −26 | −93 | ROOM2 |

| | LIVING ROOM | ROOM1 | ROOM2 | ROOM3 |
|---|---|---|---|---|
| Wi-Fi1 | X | O | O | X |
| Wi-Fi2 | X | X | X | O |
| Wi-Fi3 | O | O | O | O |
| Wi-Fi4 | O | O | O | X |

⟹ ADD Wi-Fi2 TO FEATURE SET

903

PERFORM PRIMARY FILTERING OF SELECTING N SIGNAL SOURCES IN ORDER OF HIGHEST RSSI OVERLAP SCORE FROM AMONG PLURALITY OF SIGNAL SOURCES — 1301

PERFORM, FOR EACH OF PLURALITY OF SPACES, SECONDARY FILTERING OF SELECTING M SIGNAL SOURCES IN ORDER OF HIGHEST RSSI DISTRIBUTION SCORE FROM AMONG SELECTED N SIGNAL SOURCES — 1302

SELECT SELECTED M SIGNAL SOURCES AS FEATURE SET — 1303

RSSI OVERLAP SCORE

1500a

| SIGNAL SOURCE | SCORE |
|---|---|
| CELL1 | 27.629 |
| CELL2 | 1.454 |
| Wi-Fi1 | 10.283 |
| Wi-Fi2 | 21.375 |
| Wi-Fi3 | 17.814 |
| Wi-Fi4 | 12.319 |
| Wi-Fi5 | 24.526 |

N=4

SELECT (PRIMARY FILTERING)
CELL1, Wi-Fi2, Wi-Fi3, Wi-Fi5

RSSI DISTRIBUTION SCORE

1500b

| | CELL1 | Wi-Fi2 | Wi-Fi3 | Wi-Fi5 |
|---|---|---|---|---|
| LIVING ROOM | 0.80 | 0.63 | 1.12 | 0.95 |
| ROOM1 | 1.25 | 0.88 | 1.05 | 0.71 |
| ROOM2 | 1.43 | 0.97 | 0.56 | 1.33 |

M=2

CELL1, Wi-Fi3, Wi-Fi5

SECONDARY FILTERING

|  | CELL1 | Wi-Fi3 | Wi-Fi5 | SPACE | CHUNK |
|---|---|---|---|---|---|
| Data M1 | −101 | −74 | −42 | LIVING ROOM |  |
| Data M2 | −33 | −61 | −78 | ROOM2 |  |
| Data A1 | −107 | −84 | −54 |  | chunk 1 |
| Data A2 | −39 | −57 | −81 |  | chunk 2 |
| Data A3 | −42 | −60 | −81 |  | chunk 2 |

FIG. 20

| CELL1 | CELL2 | Wi-Fi1 | Wi-Fi2 | Wi-Fi3 | Feature set1 | Feature set2 | Feature set3 | Feature set4 | Feature set5 | Feature set6 | Feature set |
|---|---|---|---|---|---|---|---|---|---|---|---|
| -107 | -94 | -84 | -58 | -74 | 1 | 1 | 1 | 1 | 1 | 1 | 1 |
| -91 | -76 | -67 | -51 | -69 | 2 | (1) | 2 | (1) | (1) | 2 | 2 |
| -82 | -80 | -59 | -37 | -70 | (3) | 2 | 2 | 2 | 2 | 2 | 2 |
| -101 | -88 | -72 | -69 | -78 | (4) | 3 | 3 | 3 | 3 | 3 | 3 |
| -92 | -74 | -69 | -52 | -68 | 1 | 1 | 1 | 1 | (2) | 1 | 1 |

2000

* Feature set1: CELL1, Wi-Fi1
* Feature set2: CELL1, Wi-Fi1, Wi-Fi2
* Feature set3: CELL1, Wi-Fi1, Wi-Fi2, Wi-Fi3
* Feature set4: CELL2, Wi-Fi1
* Feature set5: CELL2, Wi-Fi1, Wi-Fi2
* Feature set6: CELL2, Wi-Fi1, Wi-Fi2, Wi-Fi3

1

METHOD OF GENERATING TRAINING DATA FOR TRAINING INDOOR SPACE RECOGNITION MODEL, AND COMPUTING APPARATUS FOR PERFORMING THE SAME

CROSS-REFERENCE TO RELATED APPLICATIONS

This application is a continuation of International Application No. PCT/KR2023/012128, filed on Aug. 16, 2023, which claims priority to Korean Patent Application No. 10-2022-0102949, filed on Aug. 17, 2022, the disclosures of which are incorporated by reference herein their entireties.

BACKGROUND

1. Field

The disclosure relates to a model for recognizing an indoor space, and more particularly, to a method of generating training data for training an indoor space recognition model and a computing apparatus for performing the method.

2. Description of Related Art

Technologies for measuring a location of a user by using a mobile terminal the user always carries are being developed. In an outdoor space, the mobile terminal receives a global positioning system (GPS) signal transmitted from a satellite, such that the location may be measured. However, reception of GPS signals is not smooth or accurate in an indoor space, and thus, technologies other than GPS for location measurement using other schemes are being developed.

Representative indoor positioning technologies for measuring a location in an indoor space include a triangulation technique and a fingerprint technique. Among the indoor positioning technologies, the fingerprint technique is a technique that generates a database by measuring received signal strength indicators of a plurality of signals (e.g., cellular signals, Wi-Fi signals, and Bluetooth signals) at various indoor locations (e.g., houses and offices), compares, with values stored in the database, received signal strength indicators of signals measured by a mobile terminal when a location of the mobile device is to be measured, and estimates a location corresponding to data having the most similar value as the location of the mobile terminal.

SUMMARY

According to an aspect of the disclosure, a method of generating training data for training an indoor space recognition model, includes: collecting, by using a mobile terminal in a plurality of spaces included in an indoor space, data obtained by measuring received signal strength indicator (RSSI) values of signals transmitted from a plurality of signal sources; obtaining reference data in which the RSSI values measured for the signals transmitted from the plurality of signal sources are matched and stored with the plurality of spaces where measuring is performed; selecting one or more signal sources of the plurality of signal sources as a feature set based on the collected data and the reference data; performing clustering on the collected data and the reference data based on the feature set; and generating the training data by matching and storing the collected data with at least one of the plurality of spaces based on a result of the clustering.

According to an aspect of the disclosure, an apparatus for generating training data for training an indoor space recognition model, includes: a communication interface including a radio frequency (RF) receiver configured to measure a received signal strength indicator (RSSI) value of a signal; an input/output interface configured to receive an input from a user and display information; a memory storing instructions; and at least one processor configured to execute the instructions to: collect data obtained by measuring RSSI values of signals transmitted from a plurality of signal sources; obtain reference data in which the RSSI values measured for the signals transmitted from the plurality of signal sources are matched and stored with a plurality of spaces where measuring is performed; select one or more signal sources of the plurality of signal sources as a feature set based on the collected data and the reference data; perform clustering on the collected data and the reference data based on the feature set; and generate the training data by matching and storing the collected data with at least one of the plurality of spaces based on a result of the clustering.

As a technical means to achieve the technical problems, a computer-readable recording medium may have recorded thereon a program to perform at least one of the embodiments of the method set forth in the disclosure, on a computer.

As a technical means to achieve the technical problems, a computer program may be stored in a medium to perform at least one of the embodiments of the method set forth in the disclosure, on a computer.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart for describing a method of generating training data for training an indoor space recognition model, according to one or more embodiments of the disclosure;

FIG. 4 is a diagram illustrating training data for training an indoor space recognition model, according to one or more embodiments of the disclosure;

FIG. 6 is a diagram illustrating data automatically collected by a mobile terminal, according to one or more embodiments of the disclosure;

FIG. 8 is a diagram illustrating reference data manually collected by a user using mobile terminal, according to one or more embodiments of the disclosure;

FIG. 12 is a diagram for describing a method of adding, to a feature set, a signal source from which a signal is detected only in a certain space, according to one or more embodiments of the disclosure;

FIG. 16 is a diagram illustrating input data used when clustering is performed based on a selected feature set, according to one or more embodiments of the disclosure;

FIGS. 19 and 20 are diagrams for describing a method of removing data having low learning quality based on a clustering result, according to one or more embodiments of the disclosure.

DETAILED DESCRIPTION

Figure 1:
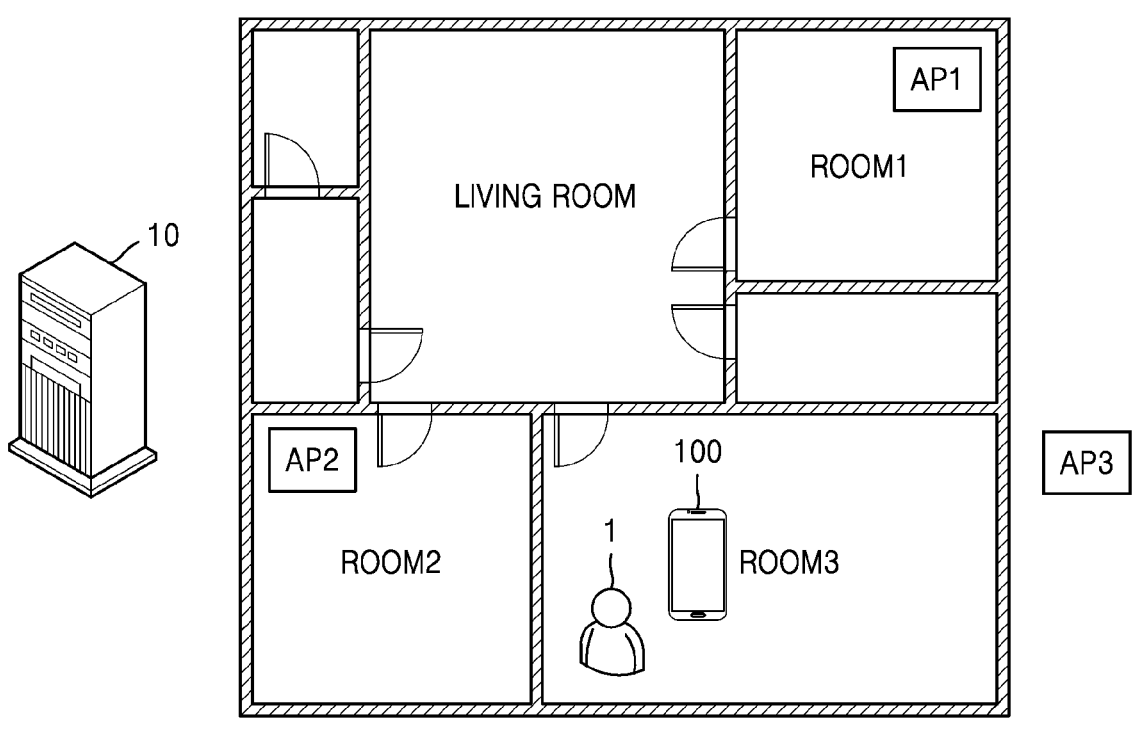
FIG. 1 is a diagram for describing an environment in which an indoor space recognition model is used, according to one or more embodiments of the disclosure.

Throughout the disclosure, the expression "at least one of a, b or c" indicates only a, only b, only c, both a and b, both a and c, both b and c, all of a, b, and c, or variations thereof.

In the description of the disclosure, descriptions of technical contents that are well known in the art to which the disclosure pertains and are not directly related to the disclosure will be omitted. This is to clearly convey the gist of the disclosure without obscuring the gist of the disclosure by omitting unnecessary description. Moreover, terms to be described below are defined considering functions in the disclosure, which may vary according to intentions of users and operators, or customs. Therefore, the definitions of the terms should be made based on the contents throughout the specification.

For the same reason, in the attached drawings, each component is exaggerated, omitted, or schematically illustrated. In addition, the size of each component does not perfectly reflect an actual size. Those components that are the same or are in correspondence are rendered the same reference numeral regardless of the figure number.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein. Rather, the embodiments of the disclosure are provided so that the disclosure will be thorough and complete, and will fully convey the concept of the disclosure to those skilled in the art. The scope of the disclosure is only defined in the claims. Throughout the specification, like reference numerals or characters refer to like components. In addition, in the description of one or more embodiments of the disclosure, when it is determined that a detailed description of a related function or configuration may unnecessarily obscure the subject matter of the disclosure, the detailed description thereof will not be provided herein. Moreover, terms to be described below are defined considering functions in the disclosure, which may vary according to intentions of users and operators, or customs. Therefore, the definitions of the terms should be made based on the contents throughout the specification.

In one or more embodiments of the disclosure, each block of flowchart illustrations and combinations of blocks in the flowchart illustrations may be implemented by computer program instructions. The computer program instructions may be provided to a processor of a general-purpose computer, a special purpose computer, or other programmable data processing equipment, and the instructions, which are executed via the processor of the computer or other programmable data processing equipment, may generate means for performing functions specified in the flowchart block(s). The computer program instructions may also be stored in a computer-usable or computer-readable memory that may direct a computer or other programmable data processing equipment to function in a particular manner, and the instructions stored in the computer-usable or computer-readable memory may produce a manufactured article including instruction means that perform the functions specified in the flowchart block(s). The computer program instructions may also be loaded onto a computer or other programmable data processing equipment.

In addition, each block of the flowchart illustrations may represent a module, a segment, or a portion of code, which includes one or more executable instructions for implementing specified logical function(s). In one or more embodiments of the disclosure, the functions noted in the blocks may occur out of the presented order. For example, two blocks shown in succession may be executed substantially concurrently or the blocks may be executed in the reverse order according to their functions.

The term ' . . . or/er' or 'unit' used in one or more embodiments of the disclosure may represent a software component or a hardware component such as a field programmable gate array (FPGA) or an application specific integrated circuit (ASIC), and the ' . . . or/er' or 'unit' may perform a specific function. In addition, the term ' . . . or/er' or 'unit' is not limited to software or hardware. The term ' . . . or/er' or 'unit' may also be configured to be included in an addressable storage medium or to reproduce one or more processors. According to one or more embodiments of the disclosure, the term ' . . . or/er' or 'unit' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided through specific components or specific ' . . . ors/ers' or 'units' may be combined to reduce the number thereof or separated into additional components.

Also, in one or more embodiments of the disclosure, the term ' . . . or/er' or 'unit' may include one or more processors.

Hereinafter, embodiments of the disclosure will be described more fully with reference to the accompanying drawings.

FIG. 1 is a diagram for describing an environment in which an indoor space recognition model is used, according to one or more embodiments of the disclosure.

Embodiments set forth herein relate to a model (e.g., an artificial neural network model) (hereinafter, referred to as a 'spatial recognition model') for recognizing a space where a mobile terminal 100 is located. The recognized space may be an indoor space such as a house or an office. The indoor space may be divided into a plurality of spaces, such as a living room, a room, or an office. In one or more examples, the spatial recognition model may identify where the mobile terminal 100 is located among the plurality of spaces.

The spatial recognition model may identify a space where the mobile terminal 100 is located, based on, for example, received signal strength indicator (RSSI) measurement values of a plurality of signals (e.g., a Wi-Fi signal and a cellular signal) received by the mobile terminal 100. As described above, a technique for identifying the location of the mobile terminal 100 based on RSSI measurement values of a plurality of signals in an indoor space is referred to as a "fingerprint technique", and data collected for the fingerprint technique (e.g., data obtained by matching values obtained by measuring RSSIs of signals at various locations in an indoor space to measurement locations) is referred to as "fingerprint data".

The embodiments set forth herein relate to a method of generating training data (fingerprint data) for training a spatial recognition model using a fingerprint technique.

In one or more embodiments of the disclosure shown in FIG. 1, the spatial recognition model may recognize a space where the mobile terminal 100 of a user 1 is located in a house including a plurality of spaces (e.g., living room, room1, room2, and room3). The spatial recognition model may also be executed by the mobile terminal 100 or by a server 10 provided inside or outside the house. The server 10 may be remotely located from the house in which the mobile terminal 100 communicates with the server 10 via a cellular network or WiFi.

According to the embodiments described herein, the method of generating training data for training the spatial recognition model may also be executed by one of the mobile terminal 100 or the server 10, or jointly performed by the mobile terminal 100 and the server 10 (e.g., processes included in the method may be divided and performed by the two apparatuses). Hereinafter, for convenience of description, it is assumed that the mobile terminal 100 alone performs the method of generating training data for training the spatial recognition model. However, as described above, the disclosure is not limited thereto, and as understood by one of ordinary skill in the art, the server 10 may also perform some or all of the processes. Accordingly, in the embodiments of the disclosure described below, it should be interpreted that, among operations performed by the mobile terminal 100, other operations except for an operation of measuring RSSIs of signals may also be performed by a separate computing apparatus such as the server 10.

In one or more embodiments of the disclosure shown in FIG. 1, a plurality of access points (APs) (AP1 to AP3) are installed inside or outside the house. In one or more embodiments of the disclosure, shown in FIG. 1, AP1 and AP2 are installed inside the house, and AP3 is installed outside the house. The mobile terminal 100 may receive Wi-Fi signals Wi-Fi1 and Wi-Fi2 transmitted from AP1 and AP2, respectively, and a Wi-Fi signal Wi-Fi3 transmitted from AP3. Each of the received Wi-Fi signals may be associated with a corresponding RSSI.

In one or more examples, in houses or offices, signals transmitted from APs installed next door or on different floors are commonly detected, and the fingerprint technique may use all signals detected in an indoor space during location identification. Therefore, according to one or more embodiments of the disclosure, the mobile terminal 100 may measure an RSSI of a Wi-Fi signal, Bluetooth signal, or a cellular signal detected in the house, measure a geomagnetic sensor value through a sensor, and generate the training data by using the measured RSSI value and geomagnetic sensor value.

For example, when the mobile terminal 100 measures RSSIs of signals when located in room2, an RSSI value of Wi-Fi2, which is a signal transmitted from AP2 located nearest to the mobile terminal 100, may be measured as the highest RSSI, an RSSI value of Wi-Fi1, which is a signal transmitted from AP1 located in the same house, may be measured the next highest RSSI, and an RSSI value of Wi-Fi3, which is a signal transmitted from AP3 installed in another house, may be measured the lowest RSSI from among the received RSSIs. As described above, because the RSSI values of the signals measured by the mobile terminal 100 are directly affected by the space where the mobile terminal 100 is located, the spatial recognition model may identify the space where the mobile terminal 100 is located, based on the RSSI values measured by the mobile terminal 100, and accordingly, the mobile terminal 100 may generate the training data by collecting values obtained by measuring the RSSIs of signals for each space.

In FIG. 1, only three signal sources AP1, AP2, and AP3 are shown for convenience of description. However, as understood by one of ordinary skill in the art, in an actual environment, tens to as many as hundreds of signals may be detected in an indoor space (e.g., house or office). Recognizing a space in consideration of all of these many types of signals is inefficient, and some signals may not be suitable to use for location (e.g., space) recognition (e.g., a case in which RSSI values measured in all indoor spaces are almost the same or too small to differentiate from each other).

Accordingly, the embodiments described herein provide a method of selecting one or more signal sources to be used for generating training data among a plurality of signal sources as a "feature set", and an operation of selecting a feature set is defined as "feature engineering".

As described above, in order to generate the training data (e.g., fingerprint data) for training the spatial recognition model, the embodiments use data obtained by measuring RSSIs of signals for each location (e.g., space) in the house. The training data may be obtained when the user 1 operates the mobile terminal 100 to measure the RSSIs of the signals and inputs into the mobile terminal 100, a space where the user 1 is currently located while carrying the mobile terminal 100 and staying in each space for a certain period of time. However, in order to collect a sufficient amount of training data to train the spatial recognition model, the user 1 needs to stay in each space and manually collect data for a long period of time, which inconveniences the user, and is highly inefficient.

Accordingly, in the embodiments described herein, instead of the user 1 having to intentionally stay in each space and manually collect the training data (fingerprint data) through the mobile terminal 100, a method by which the mobile terminal 100 automatically measures RSSIs of signals while the user 1 carries the mobile terminal 100 and freely moves around the house (without being aware of the training data collection), and generates training data by using the RSSIs is provided.

Figure 2:
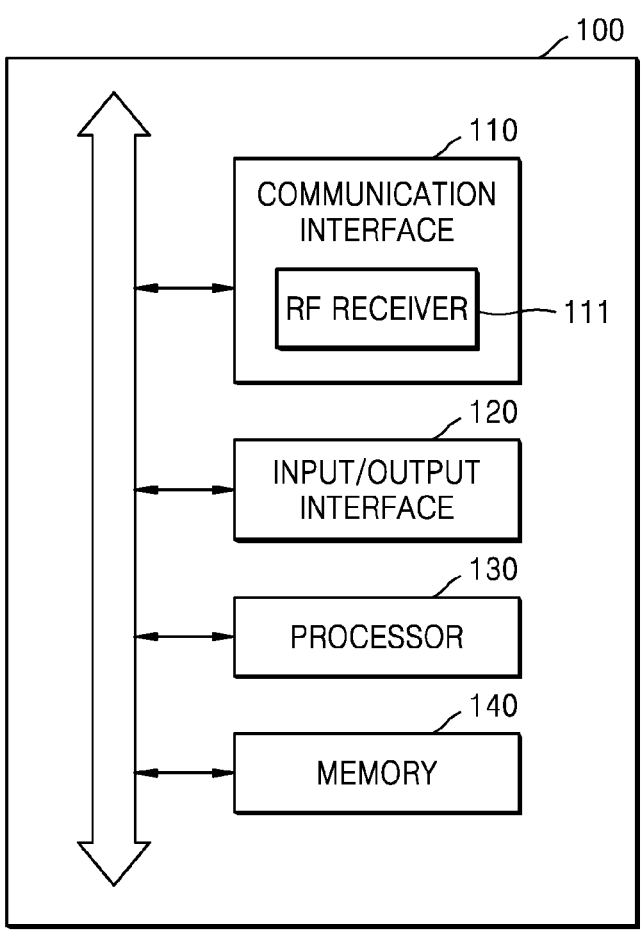
FIG. 2 is a schematic block diagram of a configuration of a computing apparatus generating training data for training an indoor space recognition model, according to one or more embodiments of the disclosure.

FIG. 2 is a schematic block diagram of a configuration of a computing apparatus generating training data for training an indoor space recognition model, according to one or more embodiments of the disclosure.

As described above, it will be described herein that the mobile terminal 100 performs an operation of generating training data, and thus, the computing apparatus shown in FIG. 2 is assumed to be the mobile terminal 100. However, as described above, some or all of the processes described below to be performed by the mobile terminal 100 may also be performed through a separate computing apparatus such as the server 10.

Referring to FIG. 2, the mobile terminal 100 according to one or more embodiments of the disclosure may include a communication interface 110, an input/output interface 120, at least one processor 130 (hereafter "the processor"), and a memory 140. However, the components of the mobile terminal 100 are not limited to the aforementioned example, and the mobile terminal 100 may include more or fewer components than the aforementioned components. In one or more embodiments of the disclosure, some or all of the communication interface 110, the input/output interface 120, the processor 130, and the memory 140 may be implemented as a single chip, and the processor 130 may include one or more processors.

The communication interface 110 may be a component for transmitting or receiving signals (e.g., control commands and data) to or from an external apparatus by wire or wirelessly and may include a communication chipset that supports various communication protocols. The communication interface 110 may include a radio frequency (RF) transmitter that up-converts and amplifies a frequency of a signal to be transmitted, and an RF receiver 111 that performs low-noise amplification on a received signal and down-converts a frequency thereof, and the RF receiver 111 may measure RSSIs of a plurality of signals. In one or more examples, the communication interface 110 may receive a signal from the outside and transmit the signal to the processor 130, or may transmit a signal output from the processor 130 to the outside.

The input/output interface 120 may include an input interface (e.g., a touch screen, a hard button, a microphone, or any other suitable input component known to one of ordinary skill in the art) for inputting a control command or information from a user, and an output interface (e.g., a display panel, a speaker, or any other suitable output component known to one of ordinary skill in the art) for displaying an execution result of an operation under control by the user, or the state of the mobile terminal 100.

The processor 130 may be a component that controls a series of processes so that the mobile terminal 100 operates according to the embodiments of the disclosure described below, and may include one or a plurality of processors. In this case, the one or plurality of processors may include a general-purpose processor such as a central processing unit (CPU), an application processor (AP), or a digital signal processor (DSP), a graphics-dedicated processor such as a graphics processing unit (GPU) or a vision processing unit (VPU), or an artificial intelligence-dedicated processor such as a neural processing unit (NPU). For example, when the one or plurality of processors include an artificial intelligence-dedicated processor, the artificial intelligence-dedicated processor may be designed in a hardware structure specialized for processing of a certain artificial intelligence model.

The processor 130 may write data into the memory 140 or read data stored in the memory 140, and in particular, process data according to a pre-defined operation rule or an artificial intelligence model by executing a program stored in the memory 140. Accordingly, the processor 130 may perform operations described in the following embodiments of the disclosure, and the operations described to be performed by the mobile terminal 100 in the following embodiments of the disclosure are performed by the processor 130 unless otherwise specified.

The memory 140 may be a component for storing various programs or data and may include a storage medium, such as read-only memory (ROM), random access memory (RAM), a hard disk, compact disc (CD)-ROM, and a digital versatile disc (DVD), or a combination of storage media. The memory 140 may not exist separately and may be included in the processor 130. The memory 140 may also include a volatile memory, a non-volatile memory, or a combination of a volatile memory and a non-volatile memory. The memory 140 may store instructions or a program which is executable by the at least one processor 130 for performing operations according to the embodiments of the disclosure described below. The memory 140 may provide stored data to the processor 130 according to a request of the processor 130.

Hereinafter, embodiments of the disclosure in which the mobile terminal 100 generates training data for training an indoor space recognition model will be described in detail.

FIG. 3 is a flowchart for describing a method of generating training data for training an indoor space recognition model, according to one or more embodiments of the disclosure.

Prior to describing operations included in the flowchart of FIG. 3, forms of training data generated by the mobile terminal 100 by performing the operations included in the flowchart of FIG. 3 will be described first. FIG. 4 is a diagram illustrating example training data for training an indoor space recognition model, according to one or more embodiments of the disclosure. Referring to FIG. 4, in one or more example, training data (e.g., fingerprint data) 400 may be in a form in which values obtained by measuring RSSIs of signals transmitted from a plurality of signal sources AP1, AP2, and AP3 are matched and stored with spaces where measuring is performed. In the embodiments of the disclosure described below, how to select signal sources (e.g., feature set) to be used for generating training data, and how to match spaces to automatically collected RSSI measurement values will be described in detail.

1. Automatic Collection of Data Obtained by Measuring RSSIs of Signals

Referring to FIG. 3, in operation 301, data obtained by measuring RSSIs of signals transmitted from a plurality of signal sources may be automatically collected by using the mobile terminal 100 stopped or moving in a plurality of spaces included in an indoor space. The automatic collection may be performed in which the user is carrying the mobile terminal 100 while the mobile terminal 100 is turned on without the user providing an input that causes the collection of the data.

Figure 5:
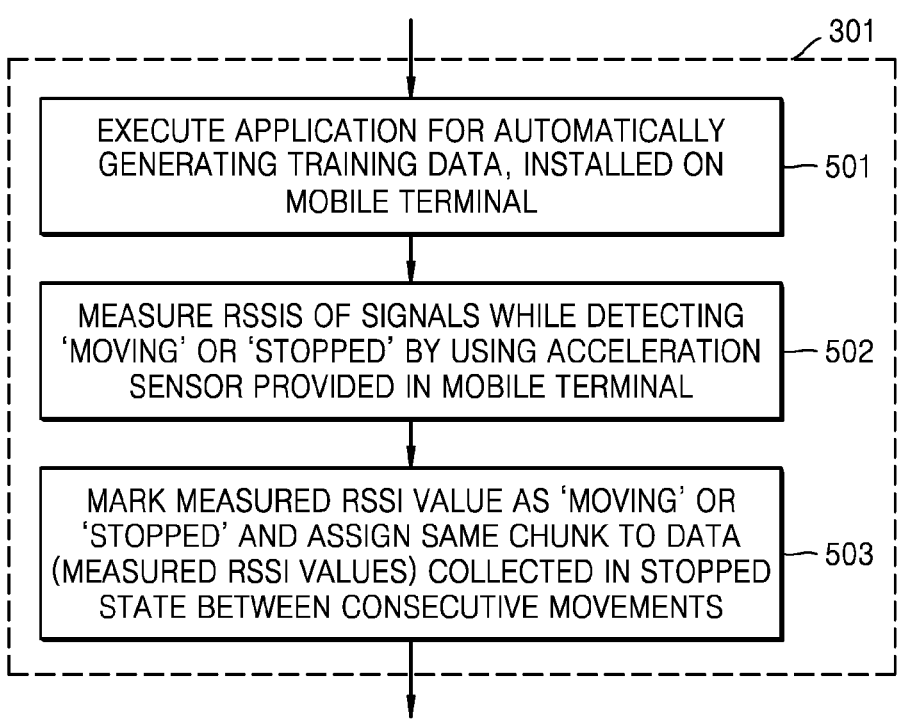
FIG. 5 is a flowchart for describing specific operations included in operation 301 of FIG. 3, according to one or more embodiments of the disclosure.

FIG. 5 is a flowchart for describing specific operations included in operation 301 of FIG. 3, according to one or more embodiments of the disclosure.

Referring to FIG. 5, in operation 501, an application for automatically generating training data, installed on the mobile terminal 100, is executed. In operation 502, after execution of the application is initiated, the mobile terminal 100 may measure RSSIs of signals by detecting 'moving' or 'stopped' by using an acceleration sensor provided in the mobile terminal 100. In operation 503, the mobile terminal 100 may mark measured RSSI values as 'moving' or 'stopped' and assign the same chunk to data (measured RSSI values) collected in a stopped state between consecutive movements of the mobile terminal 100.

The acceleration sensor may determine whether the mobile terminal 100 is moving, through acceleration measurement. When it is determined that the mobile terminal 100 is moving at a time point at which the RSSIs of the signals are measured, the processor 130 marks the measured RSSI values as 'moving'. Similarly, when it is determined that the mobile terminal 100 is not moving at the time point at which the RSSIs of the signals are measured, the processor 130 marks the measured RSSI values as 'stopped'.

The processor 130 classifies pieces of data collected in the 'stopped' state into a plurality of chunks. As described above, the same chunk is assigned to the data collected in the stopped state between consecutive movements of the mobile terminal 100. In other words, when the mobile terminal 100 moved and stopped, RSSI values measured from a time point at which the mobile terminal 100 is stopped until the mobile terminal 100 moves again are classified into the same chunk. Accordingly, it may be seen that pieces of data classified into the same chunk are collected from the same space. The assigned chunk may be used later when clustering accuracy is measured for data filtering (e.g., operation for removing data having low quality for training).

Forms of data automatically collected by the mobile terminal 100 by performing the operations included in the flowchart of FIG. 5 are shown in FIG. 6.

Referring to FIG. 6, data (hereinafter, referred to as 'automatically collected data') 600 automatically collected by the mobile terminal 100 may be in a form in which values obtained by measuring RSSIs of signals transmitted from the plurality of signal source AP1, AP2, and AP3 are matched and stored with chunks and information indicating whether a movement is detected. When the acceleration sensor detects a movement during RSSI value measurement, the processor 130 marks the movement in each data. With regard to chunk classification, as described above, as illustrated in FIG. 6, the same chunk is assigned to the data collected in the stopped state between consecutive movements of the mobile terminal 100 (e.g., chunk 2 is assigned to both Data A5 and Data A6).

In addition, according to one or more embodiments of the disclosure, automatically collected data may be obtained by using two or more mobile terminals. For example, when all family members living in the same house execute the application for automatically generating training data on their mobile terminals and move around the house, each of the mobile terminals may obtain automatically collected data by automatically measuring RSSI values of signals and integrating the same.

2. Obtainment of Reference Data (Manual Collection of Data Obtained by Measuring RSSIs of Signals)

Referring back to FIG. 3, in operation 302, the mobile terminal 100 obtains "reference data". In this case, the reference data refers to data in which RSSI values measured for the signals transmitted from the plurality of signal sources in the indoor space are matched and stored with spaces where measuring is performed. According to one or more embodiments of the disclosure, the reference data may be data manually collected by the user 1 using the mobile terminal 100. A process in which the user 1 manually collects the reference data through the mobile terminal 100 is now described with reference to FIG. 7.

Figure 7:
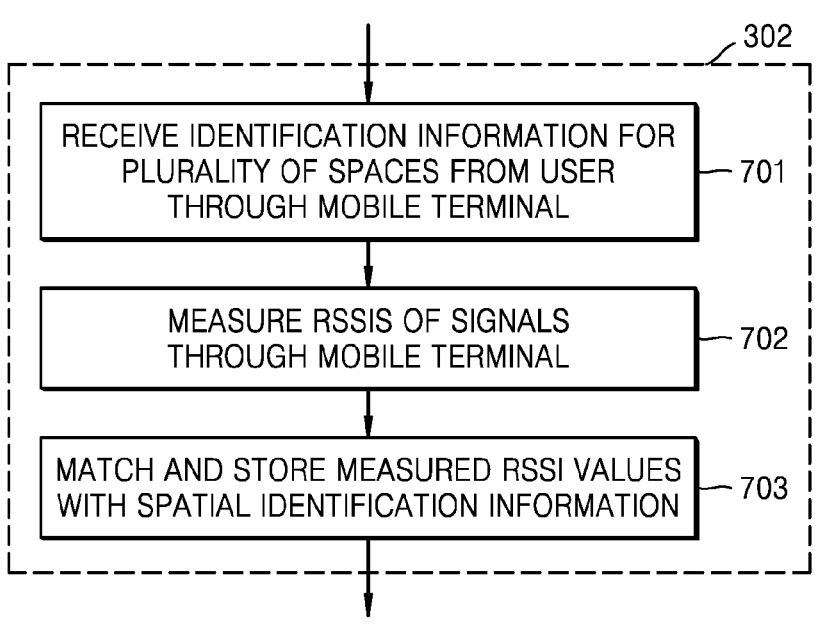
FIG. 7 is a flowchart for describing specific operations included in operation 302 of FIG. 3, according to one or more embodiments of the disclosure.

FIG. 7 is a flowchart for describing specific operations included in operation 302 of FIG. 3, according to one or more embodiments of the disclosure. According to the flowchart shown in FIG. 7, the mobile terminal 100 of user 1 measures RSSIs of a plurality of signals detected while carrying the mobile terminal 100 and staying in each indoor space fora preset time (e.g., 10 seconds), and manually inputs spaces where measuring is performed, such that reference data may be generated.

Referring to FIG. 7, in operation 701, the mobile terminal 100 receives identification information for one of a plurality of spaces from the user 1. For example, when the user 1 executes an application for generating training data on the mobile terminal 100 and sets a mode of the application to a mode for collecting reference data, the application may request the user 1 to input spatial identification information. When the user 1 inputs, into the mobile terminal 100, identification information (e.g., living room, room1, room2, or any other suitable space) for a space where the user 1 is currently located, in response to the request, the mobile terminal 100 may temporarily store the received spatial identification information in the memory 140.

In operation 702, the mobile terminal 100 may measure RSSIs of signals through the RF receiver 111. In this case, the mobile terminal 100 may measure RSSIs of all detected signals. Among RSSI values of all signals measured as described above, which values are used to generate training data may be determined by feature set selection to be described below.

In operation 703, the mobile terminal 100 may match and store the measured RSSI values with the spatial identification information. As described above, in operation 701, because the spatial identification information input by the user 1 is temporarily stored in the memory 140, the processor 130 may match and store RSSI values measured during a period until the identification information is input again, with the identification information temporarily stored in the memory 140.

According to one or more embodiments of the disclosure, because the training data is generated by automatically annotating spaces in the automatically collected data (operations 304 and 305 of FIG. 3), an amount of reference data much less than the amount of data required for training the spatial recognition model is required. Accordingly, the user 1 needs to collect reference data while carrying the mobile terminal 100 and staying in each space for only about 10 seconds. In contrast, when all the training data required for training the spatial recognition model is manually collected, the user 1 has to stay in each space for at least several minutes, which greatly reduces convenience. The method of generating training data according to one or more embodiments of the disclosure may solve this problem.

Forms of reference data obtained by the mobile terminal 100 by performing the operations included in the flowchart of FIG. 7 are shown in FIG. 8.

Referring to FIG. 8, reference data 800 obtained by the mobile terminal 100 is in a form in which RSSI values of signals transmitted from the plurality of signal sources AP1, AP2, and AP3 are matched and stored with spatial identification information. As described above, according to one or more embodiments of the disclosure, the spatial identification information may be directly input by the user 1 through the mobile terminal 100.

3. Selection of at Least One of a Plurality of Signal Sources as a Feature Set (Feature Engineering)

Referring back to FIG. 3 again, in operation 303, the mobile terminal 100 may select one or more signal sources among the plurality of signal sources as a feature set by using the automatically collected data and the reference data. In describing a feature engineering process of selecting a feature set, additional signal sources in addition to the three signal sources AP1, AP2, and AP3 shown in FIG. 1 may also be received. Hereinafter, this will be described in detail with reference to FIGS. 9 to 16.

Figure 9:
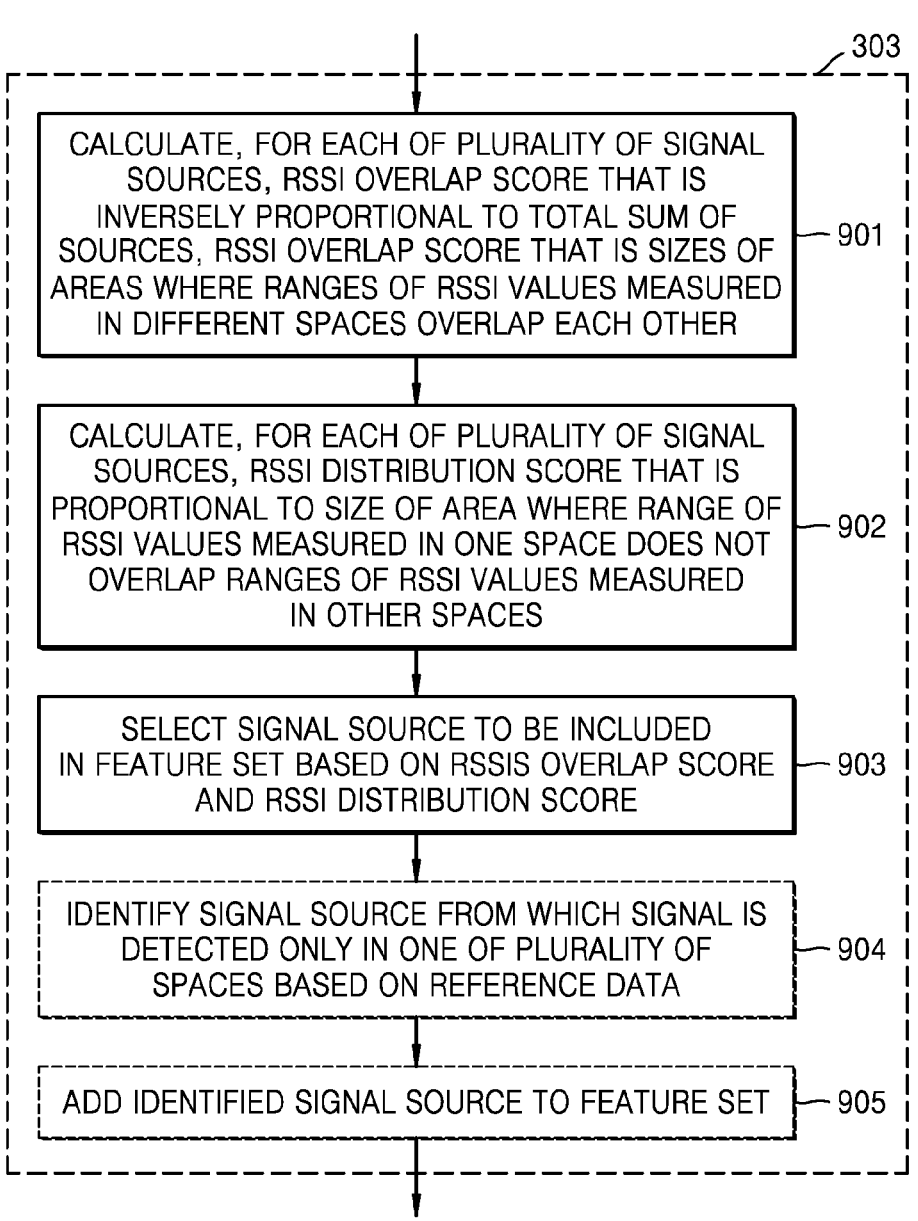
FIG. 9 is a flowchart for describing specific operations included in operation 303 of FIG. 3, according to one or more embodiments of the disclosure.

FIG. 9 is a flowchart for describing specific operations included in operation 303 of FIG. 3, according to one or more embodiments of the disclosure.

Referring to FIG. 9, in operation 901, for each of the plurality of signal sources, the mobile terminal 100 may calculate an RSSI overlap score that is inversely proportional to a total sum of sizes of areas where ranges of RSSI values measured in different spaces overlap each other. A method of calculating the RSSI overlap score is now described in detail with reference to FIG. 10.

Figure 10:
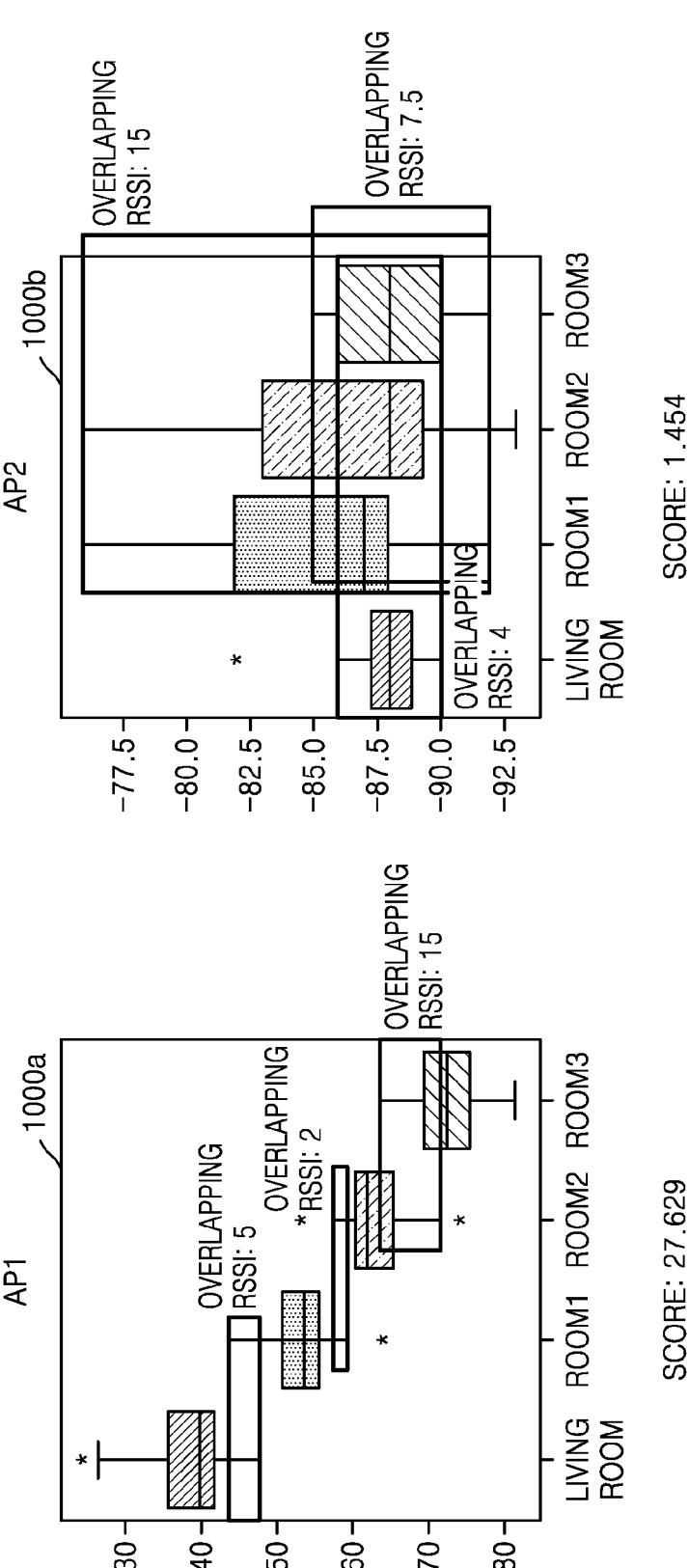
FIG. 10 is a diagram for describing a method of calculating a received signal strength indicator (RSSI) overlap score, according to one or more embodiments of the disclosure.

FIG. 10 is a diagram for describing a method of calculating an RSSI overlap score, according to one or more embodiments of the disclosure.

FIG. 10 shows a range of RSSI values measured for each space with respect to two signal sources AP1 and AP2 as a box plot. A range of RSSI values measured for a signal of AP1 is shown in a first graph 1000a, and a range of RSSI values measured for a signal of AP2 is shown in a second graph 1000b. As illustrated in FIG. 10, in each of the first and second graphs 1000a and 1000b, the sizes of areas where ranges of RSSI values measured in different spaces overlap each other are shown.

According to one or more embodiments of the disclosure, the RSSI overlap score may be calculated according to Equation 1 below. In this case, a may be an arbitrarily set constant and may be changed to an appropriate value according to circumstances.

$$RSSI \text{ overlap score} = \frac{1}{\sum_{room}^{num\,of\,room} \int_{rssi\,overlap\,start}^{rssi\,overlap\,end} P(x)dx} \times \alpha \quad \text{[Equation 1]}$$

The RSSI overlap score may be calculated for each signal source, and as identified in Equation 1, the RSSI overlap score is inversely proportional to the total sum of the sizes of areas where ranges of RSSI values measured in different spaces overlap each other.

Below the first and second graphs 1000a and 1000b shown in FIG. 10, RSSI overlap scores calculated for signal sources corresponding to respective graphs are indicated. When the first graph 1000a and the second graph 1000b are compared with each other, a size of an area where ranges of RSSI values overlap each other in the first graph 1000a is relatively smaller than that of the second graph 1000b. Accordingly, an RSSI overlap score (27.629) for AP1 was measured to be greater than an RSSI overlap score (1.454) for AP2.

Equation 1 was presented as a specific embodiment of calculating the RSSI overlap score, but the disclosure is not limited thereto. For examples, as long as a score is calculated to be inversely proportional to the total sum of the sizes of areas where ranges of RSSI values measured in different spaces overlap each other, the RSSI overlap score may be calculated by using any other suitable equation known to one of ordinary skill in the art.

Referring back to FIG. 9, in operation 902, for each of the plurality of signal sources, the mobile terminal 100 may calculate, for each of a plurality of spaces, an RSSI distribution score that is proportional to a size of an area where a range of RSSI values measured in one space does not overlap ranges of RSSI values measured in other spaces. A method of calculating the RSSI distribution score is now described in detail with reference to FIG. 11.

Figure 11:
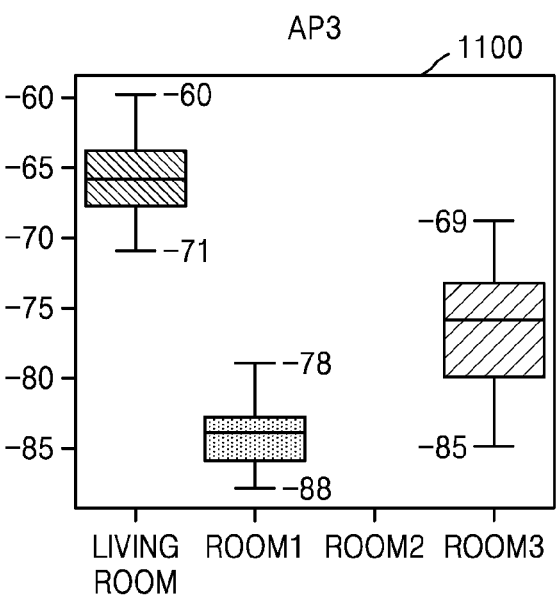
FIG. 11 is a diagram for describing a method of calculating an RSSI distribution score, according to one or more embodiments of the disclosure.

FIG. 11 is a diagram for describing a method of calculating an RSSI distribution score, according to one or more embodiments of the disclosure.

FIG. 11 shows a third graph 1100 illustrating a range of RSSI values measured for each space with respect to one signal source AP3 as a box plot. In the third graph 1100, upper and lower values of a range of RSSI values measured in each space are indicated next to the box plot.

According to one or more embodiments of the disclosure, the RSSI overlap score may be calculated according to Equation 2 below. In Equation 2, an 'RSSI range' refers to a size of an area where a range of RSSI values measured in one space does not overlap ranges of RSSI values measured in other spaces. In one or more examples, β may be an arbitrarily set constant and may be changed to an appropriate value according to circumstances.

$$RSSI \text{ distribution score} = RSSI \text{ range} \times \beta \quad \text{[Equation 2]}$$

The RSSI distribution score may be calculated for each space with respect to each of the plurality of signal sources. That is, the RSSI distribution score may be calculated for a signal source-space pair.

In one or more examples, when β is 0.1, RSSI distribution scores for combinations of AP3 and each space may be calculated based on the third graph 1100 shown in FIG. 11 as follows.

With regard to an AP3-living room pair, a region (from −69 to −71) of a range of RSSI values measured in the living room overlaps a range of RSSI values measured in the room3. Accordingly, an RSSI range for the AP3-living room pair is 9 (from −60 to −69), which corresponds to the range where there is no overlap. As a result, an RSSI distribution score for the AP3-living room pair is 0.9 (e.g., 9*0.1).

With regard to an AP3-room1 pair, a region (from −78 to −85) of a range of RSSI values measured in the room1 overlaps the range of RSSI values measured in the room3. Accordingly, an RSSI range for the AP3-room1 pair is 3 (e.g., from −85 to −88), which corresponds to the range where there is no overlap. As a result, an RSSI distribution score for the AP3-room1 pair is 0.3 (e.g., 3*0.1).

Because a signal of the AP3 is not received in the room2, an RSSI distribution score for an AP3-room2 pair is 0.

With regard to an AP3-room3 pair, the region (from −69 to −71) of the range of RSSI values measured in the room3 overlaps the range of RSSI values measured in the living room. Furthermore, the region (from −78 to −85) of the range of RSSI values measured in the room3 overlaps the range of RSSI values measured in the room1. Accordingly, an RSSI range for the AP3-room3 pair is 7 (e.g., from −71 to −78). As a result, an RSSI distribution score for the AP3-room3 pair is 0.7 (e.g., 7*0.1).

When the RSSI distribution score is high, it means that a signal has a high explanation ability to identify a specific space from other spaces. In other words, the RSSI distribution score may also refer to a score indicating the degree to which a range of RSSI values measured for a signal of each signal source in each space is identified from ranges of RSSI values measured in other spaces.

Referring to FIG. 9 again, in operation 903, the mobile terminal 100 may select a signal source to be included in a feature set based on the previously calculated RSSI overlap scores and RSSI distribution scores. As described above, the "feature set" refers to a group of one or more selected signal sources to be used when generating training data from among a plurality of signal sources from which signals are detected in an indoor space. In other words, the mobile terminal 100 may generate training data to include only RSSI values corresponding to signals of signal sources included in the feature set among RSSI values measured for a plurality of signals. Furthermore, hereinafter, when clustering is performed on data based on the feature set, this may mean that clustering is performed by using only the RSSI values corresponding to the signal sources included in the feature set among the RSSI values measured for the plurality of signals.

Figure 13:
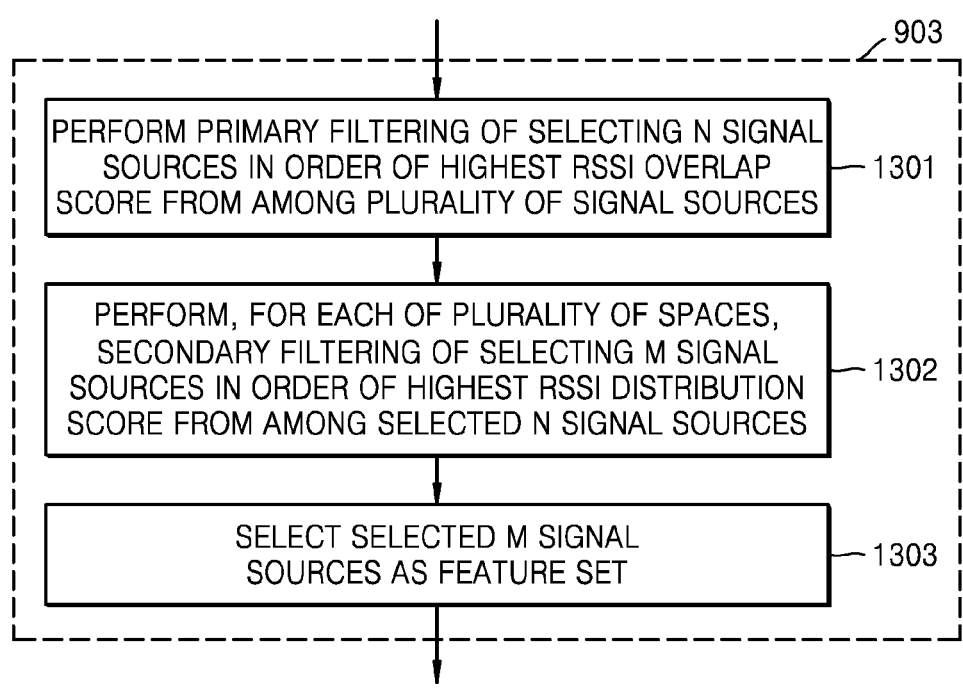
FIG. 13 is a flowchart for describing specific operations included in operation 903 of FIG. 9, according to one or more embodiments of the disclosure.

A method of selecting a signal source to be included in the feature set based on the RSSI overlap scores and the RSSI distribution score is now described in detail with reference to FIG. 13. FIG. 13 is a flowchart for describing specific operations included in operation 903 of FIG. 9, according to one or more embodiments of the disclosure.

Referring to FIG. 13, in operation 1301, the mobile terminal 100 may perform primary filtering of selecting N signal sources in order of the highest RSSI overlap score from among a plurality of signal sources. For example, the primary filtering may result in selecting the N signal sources having the N highest RSSI overlap scores. Next, in operation 1302, the mobile terminal 100 may perform, for each of the plurality of spaces, secondary filtering of selecting M signal sources in order of the highest RSSI distribution score from among the N signal sources selected as a result of the primary filtering. For example, the secondary filtering may result in selecting M signal sources from the selected N signal sources having the M highest distribution scores. In operation 1303, the mobile terminal 100 may select the M signal sources selected as a result of the secondary filtering as a feature set. Hereinafter, a method of performing primary and secondary filtering is described in detail through a specific example of FIG. 15.

Figure 15:
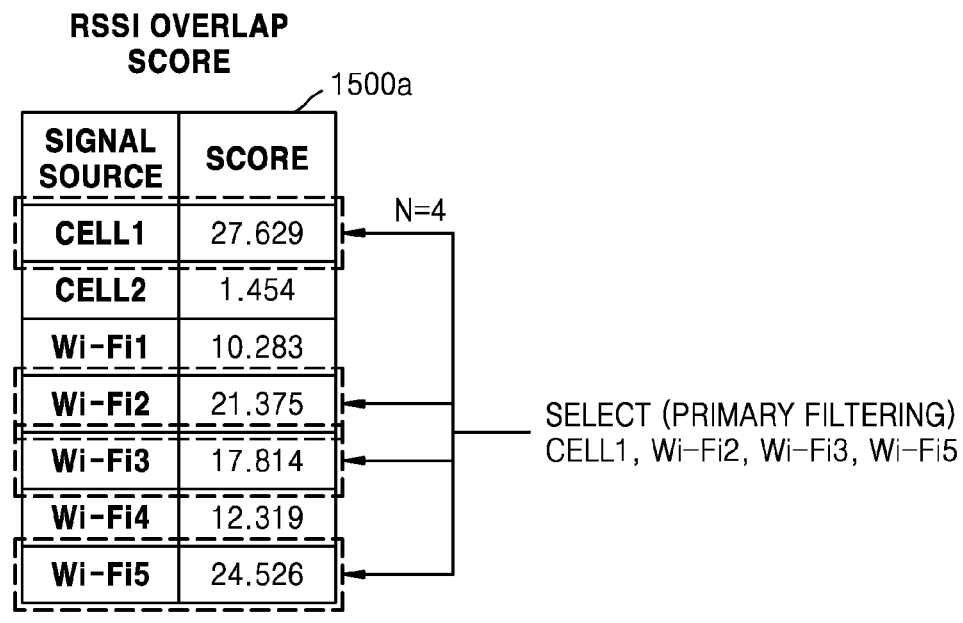
FIG. 15 is a diagram for describing a method of selecting some of a plurality of signal sources as a feature set, based on an RSSI overlap score and an RSSI distribution score, according to one or more embodiments of the disclosure.

FIG. 15 is a diagram for describing a method of selecting some of a plurality of signal sources as a feature set, based on an RSSI overlap score and an RSSI distribution score, according to one or more embodiments of the disclosure. In one or more embodiments of the disclosure shown in FIG. 15, signal sources whose RSSI values are measured are CELL1, CELL2, Wi-Fi1, Wi-Fi2, Wi-Fi3, Wi-Fi4, and Wi-Fi5.

(1) Primary Filtering

A first score table 1500a includes RSSI overlap scores of all signal sources. As described above the RSSI overlap score may be calculated for each signal source. When N is 4, the mobile terminal 100 selects four signal sources in order of the highest score from the first score table 1500a. In FIG. 15, CELL1, Wi-Fi2, Wi-Fi3, and Wi-Fi5 are selected as a result of primary filtering.

(2) Secondary Filtering

A second score table 1500b includes RSSI distribution scores of signal sources selected as a result of the primary filtering. As described above, the RSSI distribution score may be calculated for each signal source-space pair. When M is 2, the mobile terminal 100 selects two signal sources in order of the highest score for each space from the second score table 1500b. Referring to the second score table 1500b, Wi-Fi3 and Wi-Fi5 are selected for the living room, CELL1 and Wi-Fi3 are selected for the room1, and CELL1 and Wi-Fi5 are selected for the room2. Accordingly, in FIG. 15, CELL1, Wi-Fi3, and Wi-Fi5 are selected as a result of secondary filtering.

N may be set to an arbitrary value smaller than a total number of signal sources, and M may be set to an arbitrary value smaller than N. Remaining operations (operations 904 and 905) of FIG. 9 and remaining operations (operations 304 and 305) of FIG. 3 may be performed by using the feature set obtained by performing operations included in the flowchart of FIG. 13. However, as one or more embodiments of the disclosure, the remaining operations of FIGS. 9 and 3 may be performed by selecting a plurality of feature sets and then finally selecting one of the feature sets. In detail, the mobile terminal 100 may select a plurality of feature sets as preliminary feature sets while changing N and M, and select one of the preliminary feature sets as a final feature set through a comparison of clustering accuracy. A method of calculating the clustering accuracy will be described in detail with reference to FIGS. 14 and 16 below. A flowchart for describing this embodiment of the disclosure is shown in FIG. 14.

Figure 14:
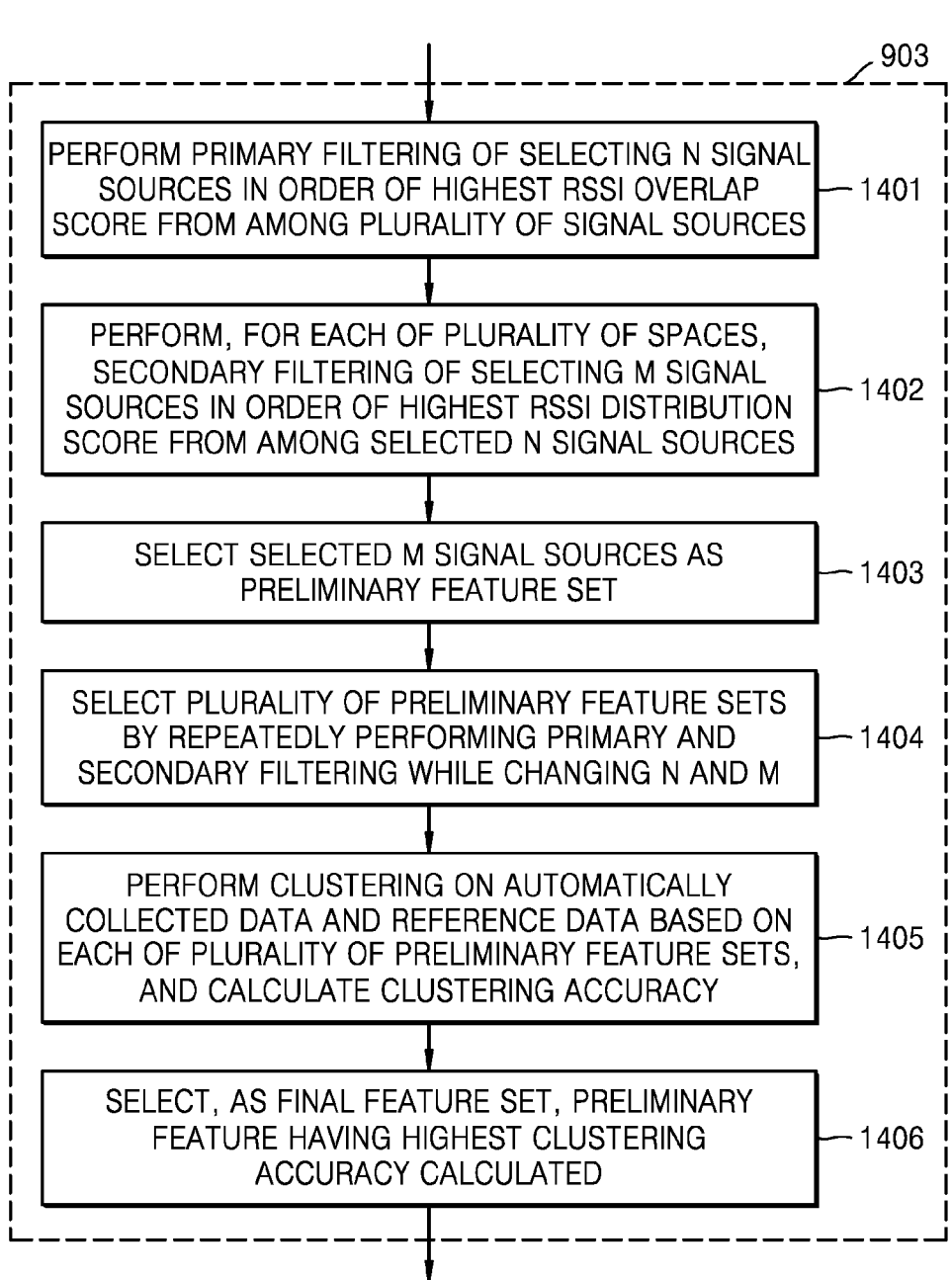
FIG. 14 is a flowchart for describing specific operations included in operation 903 of FIG. 9, according to one or more embodiments of the disclosure.

FIG. 14 is a flowchart for describing specific operations included in operation 903 of FIG. 9, according to one or more embodiments of the disclosure. Referring to FIG. 14, in operation 1401, the mobile terminal 100 may perform primary filtering of selecting N signal sources in order of the highest RSSI overlap score from among a plurality of signal sources. Next, in operation 1402, the mobile terminal 100 may perform, for each of the plurality of spaces, secondary filtering of selecting M signal sources in order of the highest RSSI distribution score from among the N signal sources selected as a result of the primary filtering. In operation 1403, the mobile terminal 100 may select the M signal sources selected as a result of the secondary filtering as a preliminary feature set.

In operation 1404, the mobile terminal 100 may select a plurality of preliminary feature sets by repeatedly performing the primary and secondary filtering (operations 1401 to 1403) while changing N and M. For example, the mobile terminal 100 may set an initial value of N to a value smaller than the total number of signal sources by 1, and set an initial value of M to a value smaller than the initial value of N by 1. The mobile terminal 100 may repeatedly select preliminary feature sets until a value of M becomes 1 by reducing the value of M by 1 from the initial value while a value of N is fixed. Next, after the value of N is reduced by 1 and the initial value of M is set to a value smaller than N by 1, the mobile terminal 100 may repeatedly select preliminary feature sets until the value of M becomes 1 by reducing the value of M by 1 from the initial value while the value of N is fixed.

In operation 1405, the mobile terminal 100 may perform clustering on automatically collected data and reference data based on each of the plurality of preliminary feature sets, and calculate clustering accuracy. Hereinafter, a method of calculating the clustering accuracy is described with reference to FIG. 16.

FIG. 16 is a diagram illustrating input data used when clustering is performed based on a selected feature set, according to one or more embodiments of the disclosure.

Input data 1600 shown in FIG. 16 is obtained by extracting only RSSI measurement values corresponding to signal sources CELL1, Wi-Fi3, and Wi-Fi5 included in a feature set, from among automatically collected data A1 to Data A3 and reference data M1. According to one or more embodiments of the disclosure, automatically collected data included in the input data 1600 may include data collected while the mobile terminal 100 is stopped, that is, chunk-assigned data. This is because chunk-assigned data may be used to calculate clustering accuracy.

FIG. 16 shows only some pieces of data included in the input data 1600, but the input data 1600 may actually include much more data.

The mobile terminal 100 performs clustering on the input data 1600 shown in FIG. 16. In performing clustering, the mobile terminal 100 may use various clustering techniques such as k-means clustering. In one or more examples, the mobile terminal 100 uses a k-means clustering technique.

The mobile terminal 100 may measure clustering accuracy for each of the automatically collected data and the reference data.

A method by which the mobile terminal 100 measures clustering accuracy for the automatically collected data is as follows. The mobile terminal 100 may measure the clustering accuracy based on a 'ratio in which the same chunk is included in the same cluster'. A more detailed description with a specific example is as follows.

In one or more examples, clusters are classified into a total of three clusters (cluster 1, cluster 2, and cluster 3) as a result of the mobile terminal 100 performing clustering on the input data 1600 based on a first preliminary feature set. In one or more examples, the total number of automatically collected data included in the input data 1600 is 30 and that data assigned with chunk 1, chunk 2, and chunk 3 are 10 each.

With regard to pieces of data included in each cluster, in one or more examples, cluster 1 includes 9 pieces of data assigned with chunk 2, cluster 2 includes no data assigned with chunk 2, and cluster 3 includes one piece of data assigned with chunk 2.

In one or more examples, cluster 2 and cluster 3 include 10 pieces of data assigned with chunk 3 and 10 pieces of data assigned with chunk 1, respectively, cluster 1 and cluster 3 include no data assigned with chunk 3, and cluster 1 and cluster 2 include no data assigned with chunk 1.

The mobile terminal 100 may determine, as a cluster corresponding to chunk 2, cluster 1 including the largest amount of data assigned with chunk 2 from among the three clusters. In one or more examples, the mobile terminal 100 may similarly determine cluster 2 as a cluster corresponding to chunk 3 and determine cluster 3 as a cluster corresponding to chunk 1.

With regard to the entire automatically collected data, 10 pieces of data assigned with chunk 1 and 10 pieces of data assigned with chunk 3 are all included in the same cluster, and 9 of 10 pieces of data assigned with chunk 2 are included in a corresponding cluster (cluster 1), but 1 piece is included in another cluster (cluster 3).

Because one piece of data among the total of 30 automatically collected data is included in an uncorrelated cluster, the clustering accuracy is about 96.67% (29/30*100). The clustering accuracy calculated as described above may be referred to as clustering accuracy for the "first preliminary feature set".

The mobile terminal 100 may calculate the clustering accuracy for all preliminary feature sets according to the method described above.

Referring back to FIG. 14 again, in operation 1406, the mobile terminal 100 may select, as a final feature set, a preliminary feature set having the highest clustering accuracy from among the plurality of preliminary feature sets.

Referring back to FIG. 9 again, as described above, after operation 903 is performed according to the flowchart of FIG. 13 or the flowchart of FIG. 14, operations 904 and 905 may be additionally performed. Operations 904 and 905 are processes for adding a signal source detected only in a specific space to the feature set.

The mobile terminal 100 may identify a signal source from which a signal is detected only in one of the plurality of spaces based on reference data in operation 904, and add the signal source identified in operation 904 to the feature set in operation 905.

FIG. 12 is a diagram for describing a method of adding, to a feature set, a signal source from which a signal is detected only in a certain space, according to one or more embodiments of the disclosure.

In a space-signal table 1200 shown in FIG. 12, O or X indicates whether or not signals are detected for each of a plurality of spaces. The mobile terminal 100 may generate the aforementioned space-signal table 1200 based on the reference data obtained in operation 302.

With regard to the space-signal table 1200, it may be identified that a Wi-Fi2 signal is detected only in one space (room3) and other signals are detected in at least two spaces. In this case, because the reception of the Wi-Fi2 signal means that a user is located in room3, it may be seen that the Wi-Fi2 signal is a signal capable of increasing the accuracy and efficiency of the spatial recognition model. Accordingly, the mobile terminal 100 may add Wi-Fi2 (AP2, which is a signal source of Wi-Fi2) to the feature set.

4. Automatic Annotation Through Clustering Based on a Selected Feature Set

Referring back to FIG. 3 again, in operation 304, the mobile terminal 100 may perform clustering on the automatically collected data and the reference data based on the selected feature set. In this case, when clustering is performed "based on the feature set", the clustering is performed by using only RSSI values corresponding to the signal sources included in the feature set among the RSSI values included in the automatically collected data and the reference data. As described above, in performing clustering, the mobile terminal 100 may use various clustering techniques such as k-means clustering, and in the present specification, it is assumed that the mobile terminal 100 uses the k-means clustering technique.

In operation 305, the mobile terminal 100 may generate training data by matching and storing the automatically collected data with at least one of the plurality of spaces based on a result of the clustering. This operation corresponds to a process in which the mobile terminal 100 performs annotation or labeling on the automatically collected data. In one or more examples, in order to perform supervised learning of an artificial neural network model, the training data is labeled. In the embodiments set forth herein, an annotation operation automatically matches identification information (e.g., living room, room1, room2, or any other suitable space) for a space where measurement is estimated to have been performed, to data (automatically collected data) including RSSI values automatically measured in the plurality of spaces, and the annotation operation corresponds to labeling. Hereinafter, a process of generating training data through annotation based on a clustering result is described in detail with reference to FIG. 17.

In one or more examples, the training data generated as a result of performing operation 305 may include only automatically collected data on which annotation has been performed, or may include both automatically collected data on which annotation has been performed, and reference data.

Figure 17:
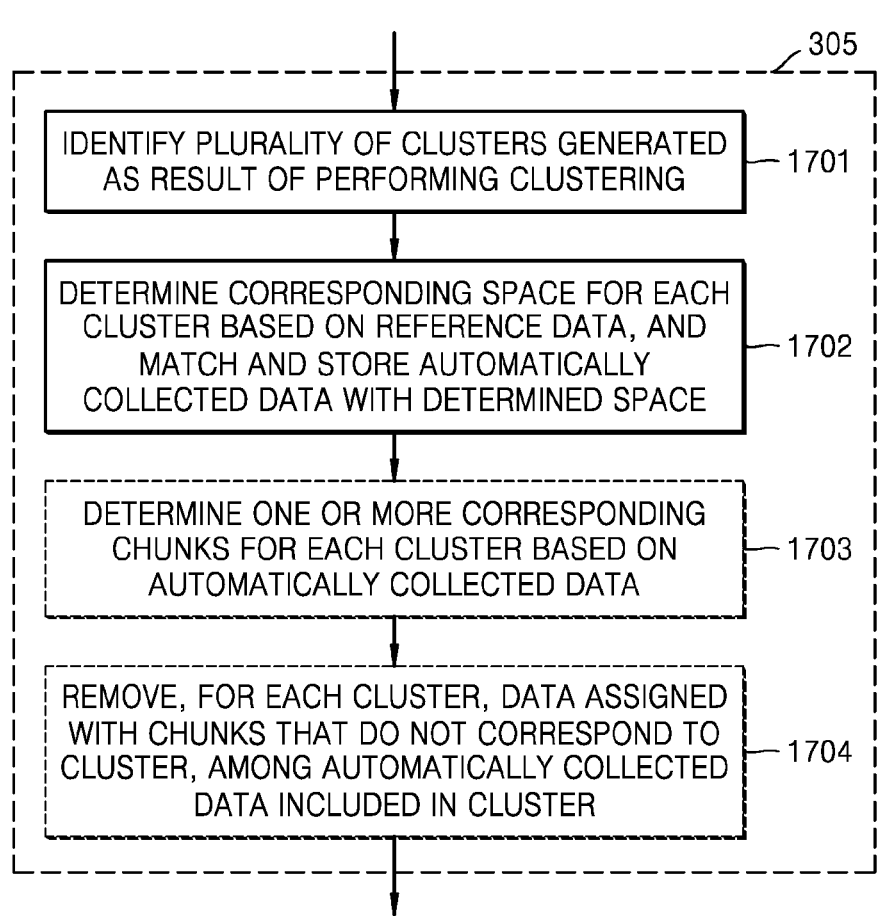
FIG. 17 is a flowchart for describing specific operations included in operation 305 of FIG. 3, according to one or more embodiments of the disclosure.

FIG. 17 is a flowchart for describing specific operations included in operation 305 of FIG. 3, according to one or more embodiments of the disclosure.

Referring to FIG. 17, in operation 1701, the mobile terminal 100 may identify a plurality of clusters generated as a result of performing clustering. For example, the mobile terminal 100 may identify, for each cluster, automatically collected data and reference data included in each cluster. In operation 1702, the mobile terminal 100 may determine a corresponding space for each cluster based on the reference data (included in each cluster), and match and store (e.g., annotate) the determined space with the automatically collected data (included in each cluster). Operations 1701 and 1702 are described in more detail with reference to FIG. 18.

Figure 18:
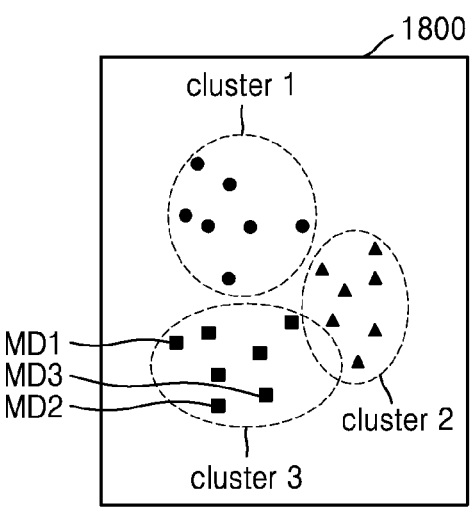
FIG. 18 is a diagram for describing a method of performing clustering on automatically collected data and reference data and automatically performing annotation based on a result of the clustering, according to one or more embodiments of the disclosure.

FIG. 18 is a diagram for describing a method of performing clustering on automatically collected data and reference data, and automatically performing annotation based on a result of the clustering, according to one or more embodiments of the disclosure.

A graph 1800 shown in FIG. 18 is expressed as a two-dimensional graph. Although data (e.g., automatically collected data and reference data) obtained by measuring RSSI values actually has multi-dimensional characteristics, the graph 1800 is expressed in a two-dimensional graph for visualization.

Referring to the graph 1800 shown in FIG. 18, the entire data (e.g., automatically collected data and reference data) is classified into a total of three clusters. As illustrated in FIG. 18, pieces of data included in cluster 1 are displayed as circles, pieces of data included in cluster 2 are expressed as triangles, and pieces of data included in cluster 3 are expressed as squares.

It is assumed that among the pieces of data included in cluster 3, MD1 to MD3 are reference data and all matched with a 'living room' as a measurement location and all other pieces of data included in cluster 3 are automatically collected data.

The mobile terminal 100 may determine that a space corresponding to cluster 3 is the 'living room' based on the reference data (e.g., MD1 to MD3) included in cluster 3. Subsequently, the mobile terminal 100 may match and store pieces of automatically collected data (e.g., others of the pieces of data expressed as squares except for MD1 to MD3) included in cluster 3 with the 'living room'.

The mobile terminal 100 may determine a space corresponding to each cluster for other clusters (e.g., cluster 1 and cluster 2) in a similar manner based on reference data included in each cluster, and match and store the space corresponding to each cluster with automatically collected data included in each cluster.

Referring back to FIG. 17 again, according to one or more embodiments of the disclosure, the mobile terminal 100 may improve the quality of training data by removing data having low learning quality among the automatically collected data. Additional operations performed by the mobile terminal 100 for this purpose are shown as operations 1703 and 1704.

In operation 1703, the mobile terminal 100 may determine one or more corresponding chunks for each cluster based on the automatically collected data. In operation 1704, the mobile terminal 100 may remove, for each cluster, data assigned with chunks that not correspond to a cluster, among automatically collected data included in the cluster. Operations 1703 and 1704 are described in detail below with reference to FIG. 19.

Figure 19:
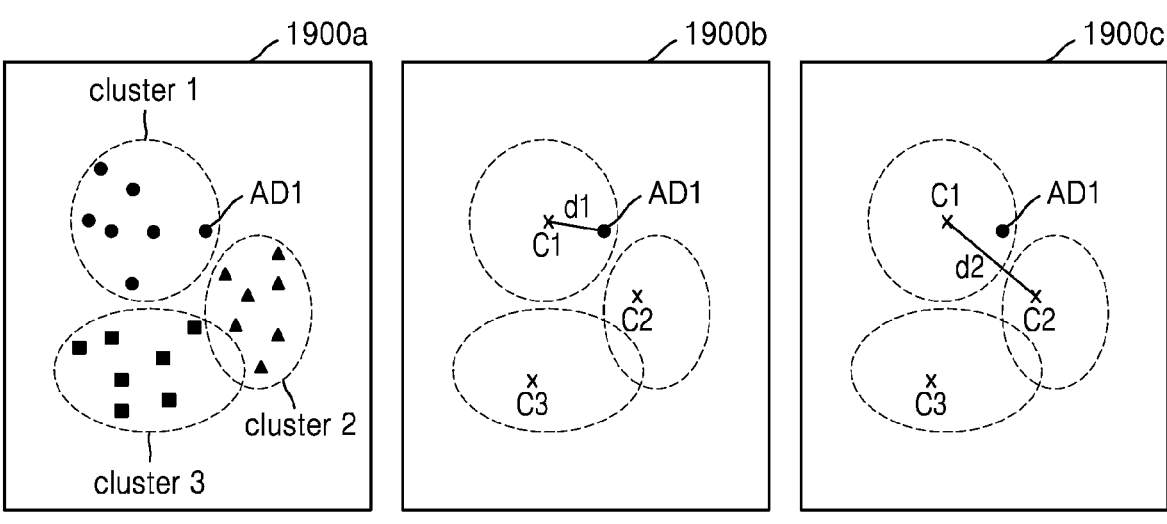

FIG. 19 is a diagram for describing a method of removing data having low learning quality based on a clustering result, according to one or more embodiments of the disclosure.

Referring to FIG. 19, results of performing clustering on the entire data (e.g., automatically collected data and reference data) are shown in three graphs (e.g., first, second, and third graphs 1900a, 1900b, and 1900c, respectively).

With regard to the first graph 1900a, the entire data (automatically collected data and reference data) are classified into a total of three clusters. For example, when most of pieces of automatically collected data included in cluster 1 are data assigned with chunk 3 and chunk 4, the mobile terminal 100 may determine that chunks corresponding to cluster 1 are chunk 3 and chunk 4. As described above, the mobile terminal 100 may determine one or more corresponding chunks for each cluster based on the automatically collected data.

For example, when a chunk assigned to AD1 that is one of the pieces of automatically collected data included in cluster 1 is chunk 2, the mobile terminal 100 may exclude AD1 from training data since AD1 may be a factor that reduces the learning quality of the spatial recognition model. As described above, the mobile terminal 100 may increase the learning quality of the training data by removing, for each cluster, data assigned with chunks that do not correspond to a cluster, among automatically collected data included in the cluster.

In addition, according to one or more embodiments of the disclosure, the mobile terminal 100 does not immediately remove data when a chunk assigned to the automatically collected data included in the cluster does not match a chunk corresponding to the cluster, but rather may determine whether to remove data by considering a distance between the data and a centroid of each cluster together. This is described in detail with reference to the second graph 1900b and the third graph 1900c of FIG. 19.

In the second graph 1900b and the third graph 1900c of FIG. 19, centroids C1 to C3 of cluster 1 to cluster 3 are shown. As described above, since a chunk (chunk 2) assigned to AD1 does not match chunks (chunk 3 and chunk 4) corresponding to cluster 1, the mobile terminal 100 measures a distance d1 between the centroid C1 of cluster 1 and AD1. Subsequently, the mobile terminal 100 compares the smallest value among distances between centroids of all clusters with d1. In one or more embodiments of the disclosure shown in FIG. 19, a distance d2 between C1 and C2 is the shortest among the distances between the centroids of the clusters, the mobile terminal 100 may remove AD1 from training data when d1 exceeds a certain ratio of d2. For example, the mobile terminal 100 may remove AD1 from the training data when d1 exceeds 40% of d2, in which case a ratio multiplied by d2 may be set to an appropriate value according to circumstances or needs.

The mobile terminal 100 may perform data filtering to remove some pieces of data predicted to have low learning quality from training data according to the method described above, and after some pieces of data are removed from the training data, the mobile terminal 100 may repeat a process of performing clustering and data filtering on other pieces of data. The mobile terminal 100 may increase the learning quality of the training data by repeatedly performing clustering and data filtering until no more data is removed. For example, the clustering and data filtering may be iteratively performed until data is no longer removed.

Moreover, according to one or more embodiments of the disclosure, the mobile terminal 100 may also remove data predicted to have low learning quality from the training data, by comparing results of performing clustering based on various other feature sets. A detailed method thereof is now described below with reference to FIG. 20.

With regard to a table 2000 shown in FIG. 20, values obtained by measuring RSSIs of five signals are shown on the left, and clusters assigned to respective pieces of data as a result of performing clustering based on different feature sets are indicated by numbers on the right.

When finally selected feature sets are CELL1, CELL2, Wi-Fi1, Wi-Fi2, and Wi-Fi3, combinations of signal sources for feature sett to feature set6 are shown at the bottom of the table 2000.

With regard to the table 2000, it may be seen that, in first data (e.g., data whose RSSI value of CELL1 is −107), clustering results based on all feature sets are equal to 1, which is the same across the feature sets. Accordingly, the first data may be predicted to have high learning quality.

In both third data (e.g., data whose RSSI value of CELL1 is −82) to fifth data (e.g., data whose RSSI value of CELL1 is −92), only a clustering result based on one feature set does not match a clustering result based on a final feature set.

In second data (e.g., data whose RSSI value of CELL1 is −91), clustering results (1) based on three feature sets (e.g., feature set2, feature set4, and feature sets) do not match a clustering result (2) based on a final feature set. Accordingly, the mobile terminal 100 may predict that the second data has the lowest learning quality and may remove the second data from the training data.

The mobile terminal 100 may generate training data by using the automatically collected data according to the method described above. When a sufficient amount of training data to generate the spatial recognition model is not generated, the mobile terminal 100 may identify spatial characteristics by analyzing signal characteristics (e.g., a distribution, average, and standard deviation of RSSI values) of training data generated using the automatically collected data, and may generate new training data based on the spatial characteristics.

For example, when spatial characteristics of a signal are identified, the mobile terminal 100 may generate new training data by using various random variable generation techniques such as Gaussian distribution-based random variable generation.

According to the aforementioned embodiments of the disclosure, while the user 1 carries the mobile terminal 100 and moves around or stops in spaces of a house, the mobile terminal 100 automatically collects data and generates training data, and thus, it is sufficient, and convenient, for the user 1 to perform an operation of collecting reference data while staying in each space only for a short period of time. Therefore, improvement of user convenience may be expected.

Furthermore, according to the aforementioned embodiments of the disclosure, the mobile terminal 100 selects one or more a plurality of signal sources as a feature set based on a result of comparing ranges of RSSI values measured for respective spaces, and thus, improvement of the learning quality may be expected.

Furthermore, according to the aforementioned embodiments of the disclosure, the mobile terminal 100 performs data filtering to remove some pieces of automatically collected data based on a clustering result, and thus, improvement of the learning quality of training data may be expected.

Various embodiments of the disclosure may be implemented or supported by one or more computer programs, and the computer programs may be formed from computer-readable program code and recorded in a computer-readable medium. In the disclosure, an "application" and "program" may refer to one or more computer programs, software components, sets of instructions, procedures, functions, objects, classes, instances, related data, or portions thereof, suitable for implementation of the computer-readable program code. The "computer-readable program code" may include various types of computer code including source code, object code, and executable code. The "computer-readable medium" may include various types of medium accessible by a computer, such as read-only memory (ROM), random access memory (RAM), a hard disk (HDD), a compact disc (CD), a digital video disc (DVD), or various types of memory.

Furthermore, a machine-readable storage medium may be provided in the form of a non-transitory storage medium. In this regard, the 'non-transitory storage medium' is a tangible apparatus, and wired, wireless, optical, or other communication links that transmit temporary electrical or other signals may be excluded. In addition, this 'non-transitory storage medium' does not identify a case where data is semi-permanently stored from a case where data is temporarily stored in the storage medium. For example, the 'non-transitory storage medium' may include a buffer in which data is temporarily stored. The computer-readable medium may be any available medium which is accessible by a computer, and may include a volatile or non-volatile medium and a detachable or non-detachable medium. The computer-readable medium includes a medium on which data may be permanently stored, and a medium on which data may be stored and overwritten later, such as a rewritable optical disc or erasable memory device.

According to one or more embodiments of the disclosure, the method according to various embodiments provided in the present document may be provided by being included in a computer program product. The computer program product may be traded as a product between a seller and a buyer. The computer program product may be distributed in the form of a machine-readable storage medium (e.g., a CD-ROM), or distributed (e.g., downloaded or uploaded) through an application store, or directly or online between two user apparatuses (e.g., smart phones). In the case of online distribution, at least a portion of a computer program product (e.g., a downloadable application) may be temporarily stored in a machine-readable storage medium, such as a memory of a manufacturer's server, an application store's server, or a relay server, or may be temporarily generated.

While the embodiments of the disclosure have been particularly shown and described, it will be understood by one of ordinary skill in the art that various changes in form and details may be made therein without departing from the spirit and scope of the disclosure. For example, even when the described techniques are performed in a different order than the described method, and/or the described components such as systems, structures, apparatuses, and circuits are coupled or combined in a different form than the described method or replaced or substituted by other components or equivalents, appropriate results may be obtained. Therefore, it should be understood that the embodiments of the disclosure described above should be considered in a descriptive sense only and not for purposes of limitation. For example, each component described in a single type may be executed in a distributed manner, and components described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

What is claimed is:

1. A method of generating training data for training an indoor space recognition model, the method comprising:

collecting, by using a mobile terminal in a plurality of spaces included in an indoor space, data obtained by measuring received signal strength indicator (RSSI) values of signals transmitted from a plurality of signal sources;

obtaining reference data in which the RSSI values measured for the signals transmitted from the plurality of signal sources are matched and stored with the plurality of spaces where measuring is performed;

selecting one or more signal sources of the plurality of signal sources as a feature set based on the collected data and the reference data;

performing clustering on the collected data and the reference data based on the feature set; and generating the training data by matching and storing the collected data with at least one of the plurality of spaces based on a result of the clustering, wherein the selecting the one or more signal sources as the feature set comprises determining whether each signal source of the plurality of signal sources is included in the feature set based on a degree to which ranges of RSSI values measured in different spaces overlap each other.

2. The method of claim 1, wherein the performing the clustering comprises performing clustering by using only an RSSI value corresponding to a signal source included in the feature set among RSSI values included in the collected data and the reference data.

3. The method of claim 1, wherein the generating of the training data comprises:

identifying a plurality of clusters generated as the result of the clustering; and determining a corresponding space for each cluster from the plurality of clusters based on the reference data, and matching and storing the collected data with the determined space.

4. The method of claim 1, wherein, among the collected data, a same chunk identifier (ID) is assigned to a plurality of pieces of data collected in a stopped state of the mobile terminal between consecutive movements of the mobile terminal, and wherein the generating the training data further comprises:

determining one or more corresponding chunk IDs for each cluster, based on the collected data; and among the collected data included in a cluster, removing, for each cluster, data assigned with a chunk ID that does not correspond to the cluster.

5. The method of claim 1, wherein the selecting the one or more signal sources from the plurality of signal sources as the feature set further comprises:

determining an RSSI overlap score for each signal source of the plurality of signal sources, the RSSI overlap score being inversely proportional to a total sum of sizes of areas where the ranges of RSSI values measured in different spaces overlap each other;

for each of the plurality of signal sources, determining an RSSI distribution score for each of the plurality of spaces, the RSSI distribution score being proportional to a size of an area where a range of RSSI values measured in one space does not overlap ranges of RSSI values measured in other spaces; and selecting a signal source from the plurality of signal sources to be included in the feature set based on the RSSI overlap score and the RSSI distribution score.

6. The method of claim 5, wherein the selecting the signal source to be included in the feature set based on the RSSI overlap score and the RSSI distribution score comprises:

performing primary filtering of selecting N signal sources in order of highest RSSI overlap scores from among the plurality of signal sources such that the N signal sources having the highest RSSI overlap scores are selected;

performing, for each of the plurality of spaces, secondary filtering of selecting M signal sources in order of highest RSSI distribution scores from among the selected N signal sources such that the M signal sources from the selected N signal sources having the highest RSSI distribution scores are selected; and selecting the M signal sources as the feature set.

7. The method of claim 6, wherein the feature set including the M signal sources is referred to as a preliminary feature set, and wherein the selecting the signal source to be included in the feature set based on the RSSI overlap score and the RSSI distribution score further comprises:

selecting a plurality of preliminary feature sets by repeatedly performing the primary and secondary filtering while changing the N and the M;

performing clustering on the collected data and the reference data, based on each of the plurality of preliminary feature sets and determining a clustering accuracy; and selecting a preliminary feature set having a highest clustering accuracy as a final feature set.

8. The method of claim 1, wherein the selecting the one or more signal sources as the feature set further comprises:

based on the reference data, identifying a signal source from which a signal is detected only in one of the plurality of spaces; and adding the identified signal source to the feature set.

9. The method of claim 1, wherein the obtaining the reference data comprises:

receiving identification information for one of the plurality of spaces from a user through the mobile terminal;

measuring the RSSI values of the signals through the mobile terminal; and matching and storing the measured RSSI values with the identification information.

10. A non-transitory computer-readable recording medium having recorded thereon instructions which are executable by at least one processor to perform the method of claim 1.

11. An apparatus for generating training data for training an indoor space recognition model, the apparatus comprising:

a communication interface comprising a radio frequency (RF) receiver configured to measure a received signal strength indicator (RSSI) value of a signal;

an input/output interface configured to receive an input from a user and display information;

a memory storing instructions; and at least one processor configured to execute the instructions to:

collect data obtained by measuring RSSI values of signals transmitted from a plurality of signal sources;

obtain reference data in which the RSSI values measured for the signals transmitted from the plurality of signal sources are matched and stored with a plurality of spaces where measuring is performed;

select one or more signal sources of the plurality of signal sources as a feature set based on the collected data and the reference data;

perform clustering on the collected data and the reference data based on the feature set; and generate the training data by matching and storing the collected data with at least one of the plurality of spaces based on a result of the clustering, wherein, when the one or more signal sources are selected as the feature set, the at least one processor is further configured to execute the instructions to determine whether each signal source of the plurality of signal sources is included in the feature set, based on a degree to which ranges of RSSI values measured in different spaces overlap each other.

12. The apparatus of claim 11, wherein, when the clustering is performed, the at least one processor is further configured to execute the instructions to perform clustering by using only an RSSI value corresponding to a signal source included in the feature set among RSSI values included in the collected data and the reference data.

13. The apparatus of claim 11, wherein, when the training data is generated, the at least one processor is further configured to execute the instructions to:

identify a plurality of clusters generated as the result of the clustering; and determine a corresponding space for each cluster from the plurality of clusters based on the reference data, and matching and storing the collected data with the determined space.

14. The apparatus of claim 11, wherein, among the collected data, a same chunk identifier (ID) is assigned to a plurality of pieces of data collected in a stopped state of the apparatus between consecutive movements of the apparatus, and when the training data is generated, the at least one processor is further configured to execute the instructions to:

determine one or more corresponding chunk IDs for each cluster, based on the collected data; and among the collected data included in a cluster, remove, for each cluster, data assigned with a chunk ID that does not correspond to the cluster.

15. The apparatus of claim 11, wherein, based on the one or more signal sources selected as the feature set, the at least one processor is further configured to execute the instructions to:

determine an RSSI overlap score for each signal source of the plurality of signal sources, the RSSI overlap score being inversely proportional to a total sum of sizes of areas where the ranges of RSSI values measured in different spaces overlap each other;

determine an RSSI distribution score for each of the plurality of spaces for each of the plurality of signal sources, the RSSI distribution score being proportional to a size of an area where a range of RSSI values measured in one space does not overlap ranges of RSSI values measured in other spaces; and select a signal source from the plurality of signal sources to be included in the feature set, based on the RSSI overlap score and the RSSI distribution score.

16. The apparatus of claim 15, wherein, when the signal source to be included in the feature set is selected based on the RSSI overlap score and the RSSI distribution score, the at least one processor is further configured to execute the instructions to:

perform primary filtering of selecting N signal sources in order of highest RSSI overlap scores from among the plurality of signal sources such that the N signal sources having the highest RSSI overlap scores are selected;

perform, for each of the plurality of spaces, secondary filtering of selecting M signal sources in order of highest RSSI distribution scores from among the selected N signal sources such that the M signal sources from the selected N signal sources having the highest RSSI distribution scores are selected; and select the selected M signal sources as the feature set.

17. The apparatus of claim 16, wherein the feature set including the M signal sources is referred to as a preliminary feature set, and when the signal source to be included in the feature set is selected based on the RSSI overlap score and the RSSI distribution score, the at least one processor is further configured to execute the instructions to:

select a plurality of preliminary feature sets by repeatedly performing the primary and secondary filtering while changing the N and the M;

perform clustering on the collected data and the reference data based on each of the plurality of preliminary feature sets and determine a clustering accuracy; and select a preliminary feature set having a highest clustering accuracy as a final feature set.

18. The apparatus of claim 11, wherein, when the one or more signal sources are selected as the feature set, the at least one processor is further configured to execute the instructions to:

based on the reference data, identify a signal source from which a signal is detected only in one of the plurality of spaces; and add the identified signal source to the feature set.

\* \* \* \* \*